(12) United States Patent
Boydston et al.

(10) Patent No.: US 11,518,087 B2
(45) Date of Patent: Dec. 6, 2022

(54) VAT PHOTOPOLYMERIZATION ADDITIVE MANUFACTURING OF MULTI-MATERIAL PARTS

(71) Applicant: University of Washington, Seattle, WA (US)

(72) Inventors: Andrew Boydston, Seattle, WA (US); Johanna Schwartz, Seattle, WA (US); Carl Thrasher, Seattle, WA (US); Troy Becker, Seattle, WA (US); Mark Ganter, Seattle, WA (US); Duane Storti, Seattle, WA (US)

(73) Assignee: UNIVERSITY OF WASHINGTON, Seattle, WA (US)

( * ) Notice: Subject to any disclaimer, the term of this patent is extended or adjusted under 35 U.S.C. 154(b) by 777 days.

(21) Appl. No.: 16/299,059

(22) PCT Filed: Sep. 11, 2017

(86) PCT No.: PCT/US2017/051019
§ 371 (c)(1),
(2) Date: Mar. 11, 2019

(87) PCT Pub. No.: WO2018/057330
PCT Pub. Date: Mar. 29, 2018

(65) Prior Publication Data
US 2020/0171740 A1    Jun. 4, 2020

Related U.S. Application Data

(60) Provisional application No. 62/456,531, filed on Feb. 8, 2017, provisional application No. 62/393,502, filed on Sep. 12, 2016.

(51) Int. Cl.
*B29C 64/129*    (2017.01)
*B29C 64/282*    (2017.01)
(Continued)

(52) U.S. Cl.
CPC .......... *B29C 64/129* (2017.08); *B29C 64/106* (2017.08); *B29C 64/245* (2017.08);
(Continued)

(58) Field of Classification Search
CPC ... B29C 64/106; B29C 64/124; B29C 64/307; B29C 64/336; B29C 64/129; B29C 64/282; B33Y 70/00; B33Y 70/10; B33Y 80/00
See application file for complete search history.

(56) References Cited

U.S. PATENT DOCUMENTS

| | | | | |
|---|---|---|---|---|
| 5,182,056 A | * | 1/1993 | Spence | ............... G03F 7/70416 118/712 |
| 2006/0066006 A1 | * | 3/2006 | Haraldsson | ............ B82Y 40/00 264/494 |

(Continued)

FOREIGN PATENT DOCUMENTS

| | | |
|---|---|---|
| WO | 2011082152 A1 | 7/2011 |
| WO | 2013030064 A1 | 3/2013 |

(Continued)

OTHER PUBLICATIONS

Calì, Jacques, Dan A. Calian, Cristina Amati, Rebecca Kleinberger, Anthony Steed, Jan Kautz, and Tim Weyrich "3D-printing of non-assembly, articulated models" ACM Transactions on Graphics (TOG) 31, No. 6 (2012): 130.

(Continued)

*Primary Examiner* — Philip C Tucker
*Assistant Examiner* — Jimmy R Smith, Jr.
(74) *Attorney, Agent, or Firm* — Christensen O'Connor Johnson Kindness PLLC

(57) ABSTRACT

The present disclosure provides a method of making an article, including: providing a composition comprising two or more types of polymerizable monomers and two or more
(Continued)

types of polymerization initiators; exposing the build region to one or more polymerization stimuli; polymerizing the two or more polymerizable monomers at the build region to provide a polymer layer; and advancing the polymer layer away from the build region to provide a three-dimensional article containing two or more integrally mixed polymers.

17 Claims, 11 Drawing Sheets

(51) Int. Cl.
| | | |
|---|---|---|
| | *B29C 64/245* | (2017.01) |
| | *B29C 64/106* | (2017.01) |
| | *B33Y 70/10* | (2020.01) |
| | *B33Y 10/00* | (2015.01) |
| | *B33Y 70/00* | (2020.01) |
| | *B33Y 80/00* | (2015.01) |
| | *B29C 64/124* | (2017.01) |
| | *C08F 220/28* | (2006.01) |
| | *C08F 2/50* | (2006.01) |
| | *C08F 220/58* | (2006.01) |
| | *C08G 18/10* | (2006.01) |
| | *C08G 18/67* | (2006.01) |
| | *C08G 59/24* | (2006.01) |
| | *C08K 5/06* | (2006.01) |
| | *C08K 5/372* | (2006.01) |
| | *B33Y 30/00* | (2015.01) |

(52) U.S. Cl.
CPC ............ *B29C 64/282* (2017.08); *B33Y 70/10* (2020.01); *C08F 2/50* (2013.01); *C08F 220/281* (2020.02); *C08F 220/58* (2013.01); *C08G 18/10* (2013.01); *C08G 18/672* (2013.01); *C08G 59/24* (2013.01); *C08K 5/06* (2013.01); *C08K 5/372* (2013.01); *B29C 64/124* (2017.08); *B29K 2995/0063* (2013.01); *B33Y 10/00* (2014.12); *B33Y 30/00* (2014.12); *B33Y 70/00* (2014.12); *B33Y 80/00* (2014.12)

(56) References Cited

U.S. PATENT DOCUMENTS

| | | |
|---|---|---|
| 2013/0147092 A1 | 6/2013 | Jenko et al. |
| 2014/0099476 A1 | 4/2014 | Subramanian et al. |
| 2015/0290875 A1 | 10/2015 | Mark et al. |
| 2016/0160077 A1* | 6/2016 | Rolland ............... C09D 175/08 521/134 |

FOREIGN PATENT DOCUMENTS

| | | |
|---|---|---|
| WO | 2014126834 A2 | 8/2014 |
| WO | 2015077262 A1 | 5/2015 |
| WO | 2015164234 A1 | 10/2015 |
| WO | 2016007495 A1 | 1/2016 |

OTHER PUBLICATIONS

Choi, J.-W., MacDonald, E., Wicker, R. "Multi-material microstereolithography" The International Journal of Advanced Manufacturing Technology, 49(5), 543-551, 2010.

Cotteleer, M., Neier, M., Crane, J., "3D opportunity in tooling", Deloitte University Press, 2014.

Quan, Zhenzhen, Amanda Wu, Michael Keefe, Xiaohong Qin, Jianyong Yu, Jonghwan Suhr, Joon-Hyung Byun, Byung-Sun Kim, and Tsu-Wei Chou "Additive manufacturing of multi-directional preforms for composites: opportunities and challenges" Materials Today 18, No. 9 (2015): 503-512.

Sugavaneswaran, M., Arumaikkannu, G. "Modelling for randomly oriented multi material additive manufacturing component and its fabrication" Materials and Design, 54, 779-785, 2014.

Tumbleston, John R., David Shirvanyants, Nikita Ermoshkin, Rima Janusziewicz, Ashley R. Johnson, David Kelly, Kai Chen "Continuous liquid interface production of 3D objects" Science 347, No. 6228 (2015): 1349-1352.

Wong, K.V., Hernandez, A. "A Review of Additive Manufacturing", ISRN Mechanical Engineering, 2012.

Zhou, C., Chen, Y., Yang, Z.G., Khoshnevis, B. "Digital material fabrication using mask-image-projection-based stereolithography" Rapid Prototyping Journal, 19(3), 153-165, 2013.

International Search Report and Written Opinion dated Mar. 6, 2018, issued in corresponding International Application No. PCT/US2017/051019, filed Sep. 11, 2017, 8 pages.

International Preliminary Report on Patentability dated Mar. 12, 2019, issued in corresponding International Application No. PCT/US2017/051019, filed Sep. 11, 2017, 1 page.

* cited by examiner

VAT PHOTOPOLYMERIZATION ADDITIVE MANUFACTURING OF MULTI-MATERIAL PARTS

CROSS-REFERENCES TO RELATED APPLICATION(S)

This application is a National Stage of PCT/US2017/051019, filed on Sep. 11, 2017, which claims the benefit of U.S. Provisional Application No. 62/393,502, filed Sep. 12, 2016; and U.S. Provisional Application No. 62/456,531, filed Feb. 8, 2017; the disclosures of each of which are incorporated herein by reference in their entirety.

STATEMENT OF GOVERNMENT LICENSE RIGHTS

This invention was made with Government support under DMR-1452726, awarded by the National Science Foundation; under DGE-1256082, awarded by the National Science Foundation; and under W911NF-15-1-0139, awarded by the Army Research Office. The Government has certain rights in the invention.

BACKGROUND

Both vat photopolymerization and photojetting additive manufacturing processes use liquid photoresins that can be controllably and repeatedly polymerized by irradiating with light so as to produce an object of desired geometry. The final materials resulting from these processes are traditionally highly crosslinked materials with little flexibility or range of elastic response. While many photopolymerizations to create highly elastic materials have been reported, such methods are typically not amenable to additive manufacturing processes. The reasons for this are numerous, but the most common factors include vulnerabilities to oxygen inhibition effects, long cure times, and viscosities so large as to be unwieldy. Attempting to adapt standard photopolymerization processes is also a non-trivial effort. For example, attempts to decrease cure times by increasing the ratio of photoactive components to monomer can result in lower molecular weight polymer chains which detract from the final desired material properties. Alternatively, increasing the intensity of irradiation used to increase the curing rate can lead to unintended light scattering effects which create outgrowth and can hinder the resolution of additive manufacturing processes. Adding dye or pigment to block such effects can compensate for light scattering effects, but also tend to negate the effect of increased irradiation. Photoresins with high capacity to covalently crosslink overcome many of the aforementioned limiting factors because they tend to solidify quickly and are not necessarily reliant on high polymer conversion rates or molecular weights for their material properties. However, the high degree of crosslinking inherent to these photoresins tends to make the resulting polymer hard, brittle, and inelastic.

Therefore, compositions that are suitable for additive manufacturing processes are needed. Methods of forming articles using additive manufacturing having tunable chemical and mechanical properties are also needed. The present disclosure seeks to fulfill these needs and provides further related advantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure features a method of making an article, including:

(a) providing a composition comprising two or more types of polymerizable monomers and two or more types of polymerization initiators, wherein the composition comprises a build region, provided that each type of polymerizable monomer is configured to be polymerizable using one type of polymerization initiator, and the one type of polymerization initiator cannot polymerize a different type of polymerizable monomer;

(b) exposing the build region to one or more polymerization stimuli;

(c) polymerizing the two or more polymerizable monomers at the build region to provide a polymer layer; and (d) advancing the polymer layer away from the build region to provide a three-dimensional article containing two or more integrally mixed polymers.

In some embodiments, the composition is in the form of a first liquid layer and a second liquid layer, and the build region is at a liquid-liquid interface between the first and second liquid layers; wherein at least one of the first liquid layer and the second liquid layer comprises at least one polymerization initiator of the two or more types of polymerization initiators; at least one of the first liquid layer and the second liquid layer comprises at least one type of polymerizable monomers of the two or more types of polymerizable monomers; and the second liquid layer has a lower density than the first liquid layer.

In another aspect, the present disclosure features an article, made according to the methods described herein.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present disclosure provides a method of making an article, including: providing a composition comprising two or more types of polymerizable monomers and two or more types of polymerization initiators, wherein the composition comprises a build region (provided that each type of polymerizable monomer is configured to be polymerizable using one type of polymerization initiator, and the one type of polymerization initiator cannot polymerize a different type of polymerizable monomer); exposing the build region to one or more polymerization stimuli; polymerizing the two or more polymerizable monomers at the build region to provide a polymer layer; and advancing the polymer layer away from the build region to provide a three-dimensional article containing two or more integrally mixed polymers.

Figure 1:
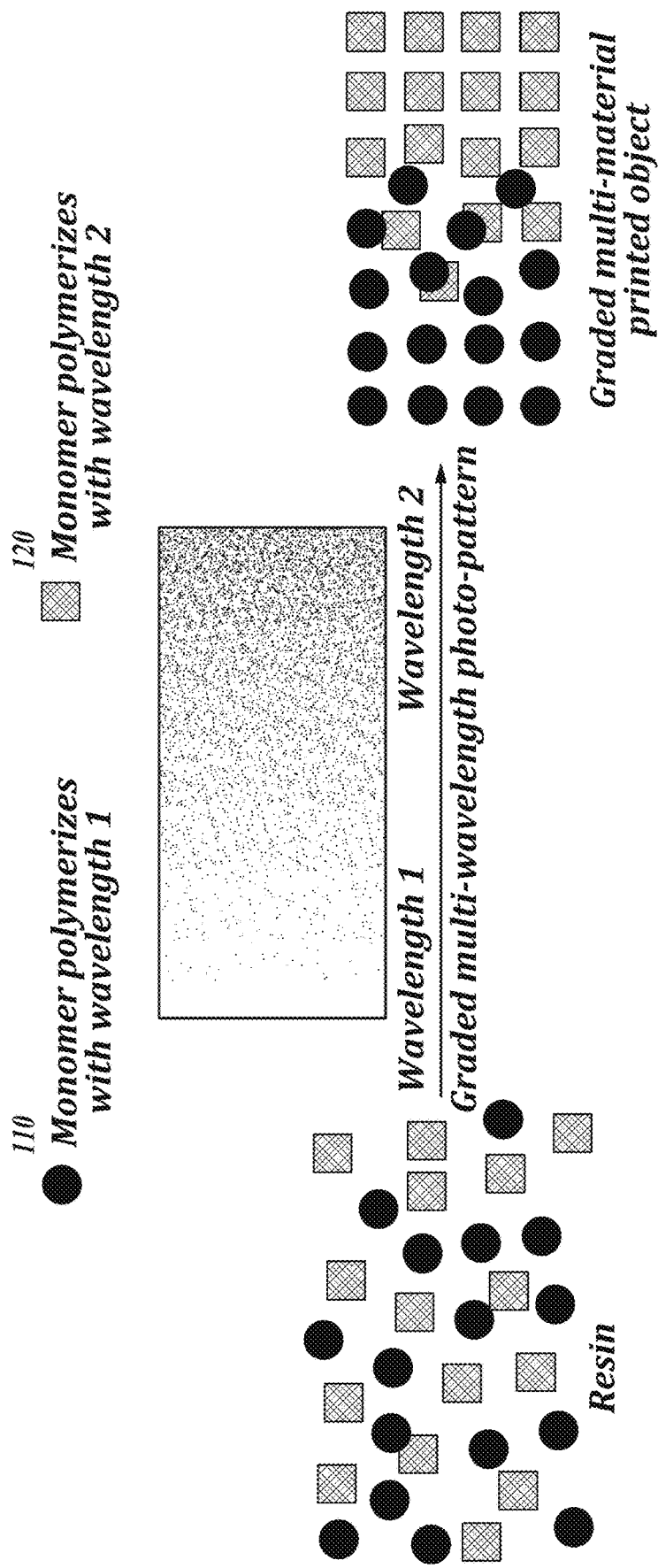
FIG. 1 is a schematic representation of an embodiment of an additive manufacturing process using multiple polymerization stimuli.
Figure 2:
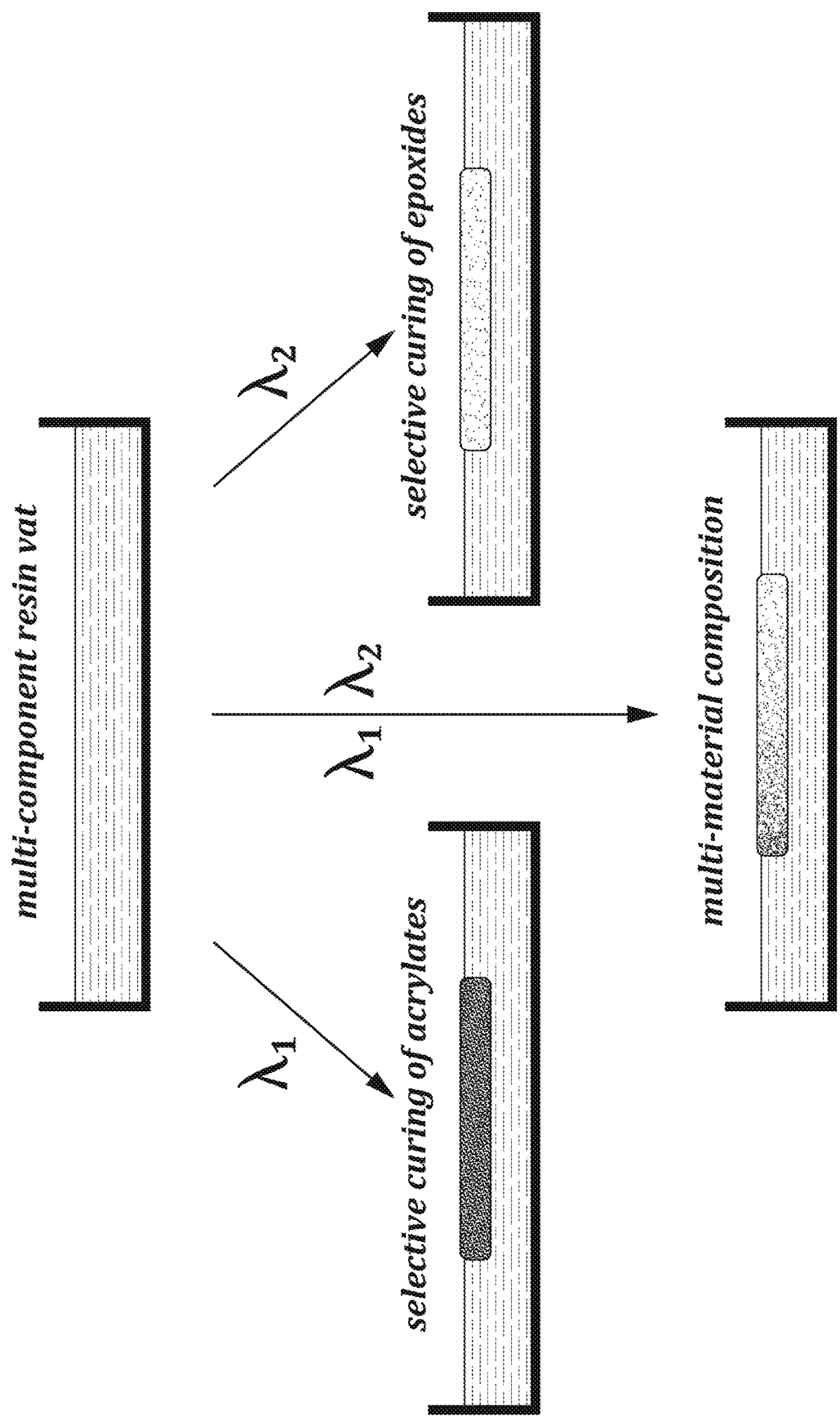
FIG. 2 is a diagram of an embodiment of an additive manufacturing process using multiple wavelengths of light.

FIG. 1 provides an illustration of an embodiment of the methods of the present disclosure. Referring to FIG. 1, the methods include providing a composition including monomers 110 that are polymerizable with an irradiation of wavelength 1, and monomers 120 that are polymerizable with an irradiation of wavelength 2. During the polymerization process, irradiation at a build region is gradually shifted from wavelength 1, to a mixture of wavelengths 1 and 2 where the area of the build region corresponding to wavelength 2 is increased over the course of the manufacturing process, and finally to wavelength 2. The resulting manufactured article has a gradient of polymers, having a cross-sectional composition that shifts gradually from a polymer made from monomers 110, to a mixture of polymers made from monomers 110 and 120 where the polymer made from 120 gradually increases in proportion relative to the polymer made from 110, to a polymer made from monomers 120. As an example, FIG. 2 provides a method where a first monomer corresponds to acrylates polymerizable using a wavelength $\lambda_1$ and the second monomer corresponds to epoxides polymerizable using a wavelength $\lambda_2$.

In certain embodiments, a specific stimulus is configured to initiate polymerization for a given polymerization initiator and a given type of monomer, and not any other polymerization initiator and type of monomer (i.e., the specific stimulus is orthogonal) in a manner sufficient to provide a polymer. In some embodiments, a specific stimulus can initiate polymerization for two or more types of polymerization initiator and two or more types of monomers. A given type of monomers can be polymerizable with only one type of polymerization initiator. In some embodiments, a given type of polymerization initiator can polymerize more than one type of monomers (e.g., two types, three types, four types, etc.). The methods can include any number of additional sets of monomers and corresponding stimuli operative to initiate polymerization and polymerize their respective sets of monomers.

In some embodiments, the present disclosure provides a method of additive manufacturing including: providing a first stimulus that is configured to polymerize a first set of monomers in a container; and providing a second stimulus different from the first stimulus that is configured to polymerize a second set of monomers in the container to provide a polymeric object that includes both a polymer formed from the first set of monomers and a polymer formed from the second set of monomers.

Figure 3:
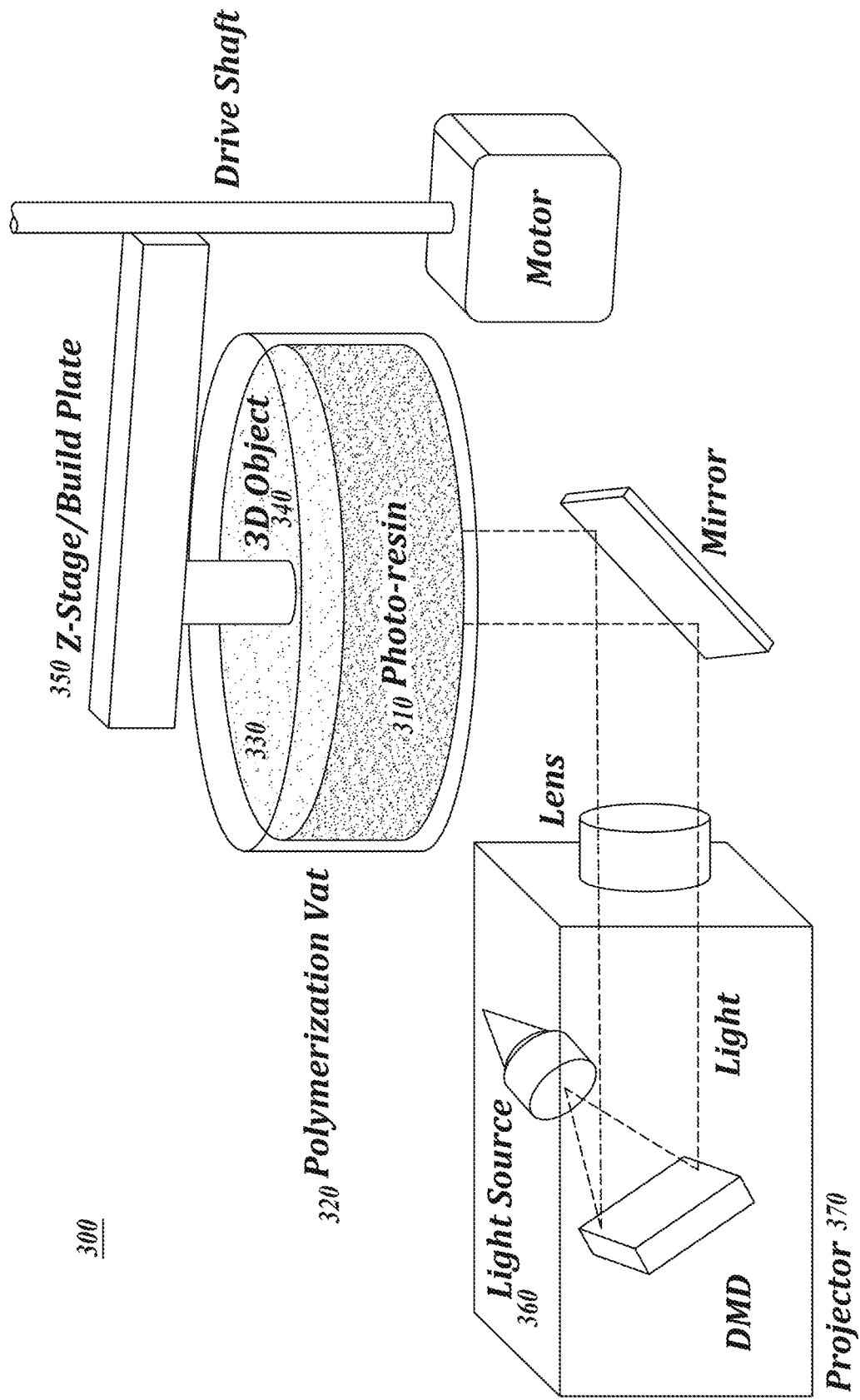
FIG. 3 Schematic representation of a DLP 3D printer. In a DLP 3D printer, 3D model files are sectioned into thin slices, or layers, represented by a series of black and white images. Objects are printed by sequential projection of each image into the polymerizable composition in a vat container while raising the z-stage between each image.

FIG. 3 is an illustration of an exemplary vat polymerization system 300. Referring to FIG. 3, system 300 has a light-polymerizable composition 310 in a container 320 having a region that is light-permeable. An irradiation source 360 and projector 370 projects an irradiation pattern onto a build region 330, and a vertically movable build surface 350 is configured to draw the polymerized layers upward as an article 340 is manufactured in a layer-by-layer manner at build region 330.

In some embodiments, the composition is in the form of a first liquid layer and a second liquid layer, and the build region is at a liquid-liquid interface between the first and second liquid layers; at least one of the first liquid layer and the second liquid layer includes at least one polymerization initiator of the two or more types of polymerization initiators; at least one of the first liquid layer and the second liquid layer includes at least one type of polymerizable monomers of the two or more types of polymerizable monomers; and the second liquid layer has a lower density than the first liquid layer.

Figure 4:
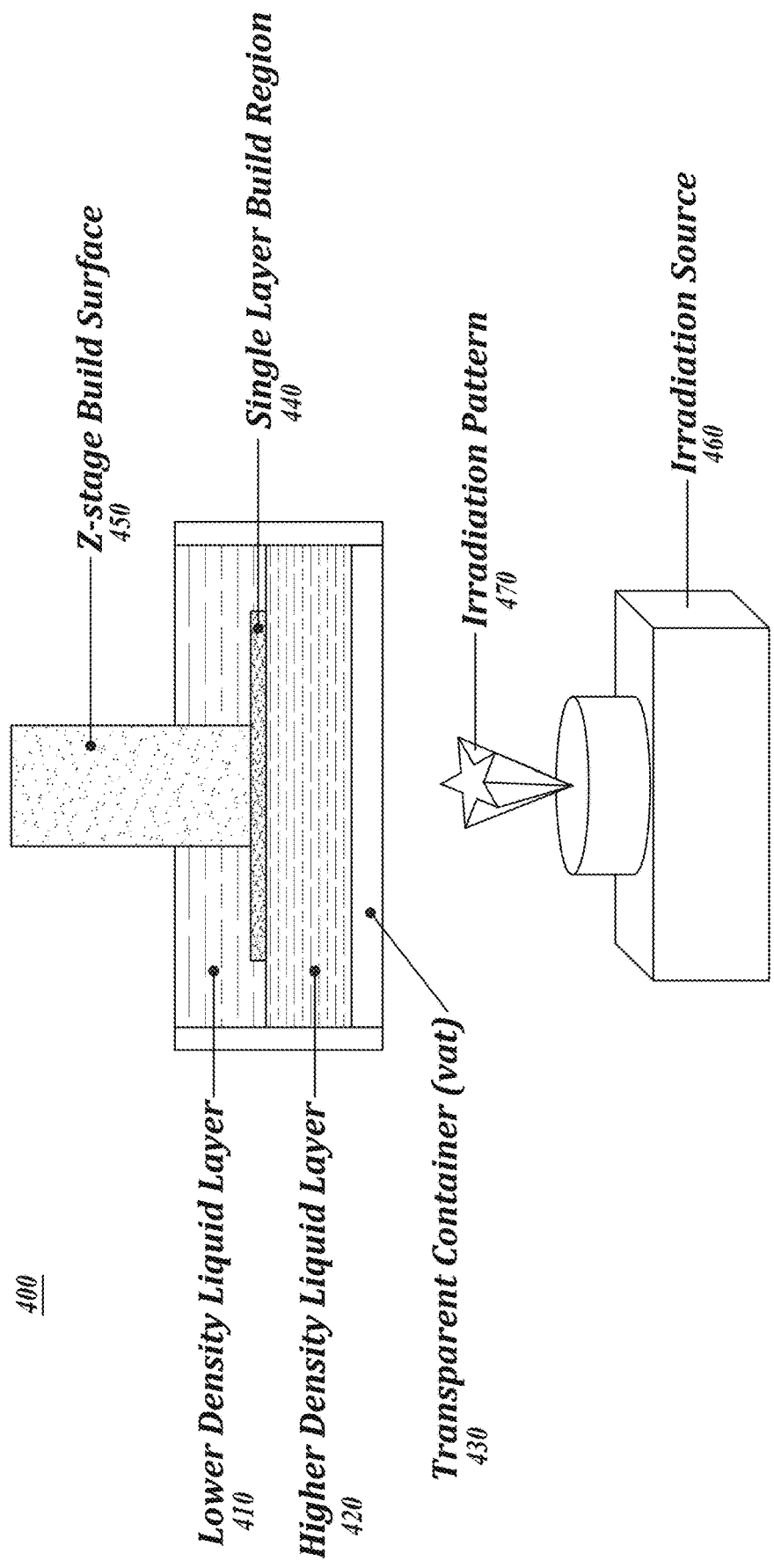
FIG. 4 is a schematic representation of an embodiment of a two-layer additive manufacturing system.

FIG. 4 is an illustration of an exemplary two-layer polymerization system 400. Referring to FIG. 4, system 400 has a composition that has a lower density liquid layer 410 and a higher density liquid layer 420 in a transparent container 430. A build region 440 is positioned between layer 410 and 420, and a vertically movable build surface 450 is configured to draw the polymerized layers upward as an article is manufactured in a layer-by-layer manner at build region 440. An irradiation source 460, such as a laser, is provided. The irradiation source 460 can project an irradiation pattern 470 onto the build region 340.

Definitions

At various places in the present specification, substituents of compounds of the disclosure are disclosed in groups or in ranges. It is specifically intended that the disclosure include each and every individual subcombination of the members of such groups and ranges. For example, the term "$C_{1-6}$ alkyl" is specifically intended to individually disclose methyl, ethyl, $C_3$ alkyl, $C_4$ alkyl, $C_5$ alkyl, and $C_6$ alkyl.

It is further intended that the compounds of the disclosure are stable. As used herein "stable" refers to a compound that is sufficiently robust to survive isolation to a useful degree of purity from a reaction mixture.

It is further appreciated that certain features of the disclosure, which are, for clarity, described in the context of separate embodiments, can also be provided in combination in a single embodiment. Conversely, various features of the disclosure which are, for brevity, described in the context of a single embodiment, can also be provided separately or in any suitable subcombination.

"Optionally substituted" groups can refer to, for example, functional groups that may be substituted or unsubstituted by additional functional groups. For example, when a group is unsubstituted, it can be referred to as the group name, for example alkyl or aryl. When a group is substituted with additional functional groups, it may more generically be referred to as substituted alkyl or substituted aryl.

As used herein, the term "substituted" or "substitution" refers to the replacing of a hydrogen atom with a substituent other than H. For example, an "N-substituted piperidin-4-yl" refers to replacement of the H atom from the NH of the piperidinyl with a non-hydrogen substituent such as, for example, alkyl.

As used herein, the term "alkyl" refers to a straight or branched hydrocarbon groups. In some embodiments, alkyl has 1 to 10 carbon atoms (e.g., 1 to 8 carbon atoms, 1 to 6 carbon atoms, 1 to 3 carbon atoms, 1 or 2 carbon atoms, or 1 carbon atom). Representative alkyl groups include methyl, ethyl, propyl (e.g., n-propyl, isopropyl), butyl (e.g., n-butyl, sec-butyl, and tert-butyl), pentyl (e.g., n-pentyl, tert-pentyl, neopentyl, isopentyl, pentan-2-yl, pentan-3-yl), and hexyl (e.g., n-hexyl and isomers) groups.

As used herein, the term "alkylene" refers to a linking alkyl group.

As used herein, the term "cycloalkyl" refers to non-aromatic carbocycles including cyclized alkyl, alkenyl, and alkynyl groups. Cycloalkyl groups can include mono- or polycyclic (e.g., having 2, 3 or 4 fused rings) ring systems, including spirocycles. In some embodiments, cycloalkyl groups can have from 3 to about 20 carbon atoms, 3 to about 14 carbon atoms, 3 to about 10 carbon atoms, or 3 to 7 carbon atoms. Cycloalkyl groups can further have 0, 1, 2, or 3 double bonds and/or 0, 1, or 2 triple bonds. Also included in the definition of cycloalkyl are moieties that have one or more aromatic rings fused (i.e., having a bond in common with) to the cycloalkyl ring, for example, benzo derivatives of pentane, pentene, hexane, and the like. A cycloalkyl group having one or more fused aromatic rings can be attached though either the aromatic or non-aromatic portion. One or more ring-forming carbon atoms of a cycloalkyl group can be oxidized, for example, having an oxo or sulfido substituent. Example cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcamyl, adamantyl, and the like.

As used herein, the term "cycloalkylene" refers to a linking cycloalkyl group.

As used herein, the term "aryl" refers to an aromatic hydrocarbon group having 6 to 10 carbon atoms. Representative aryl groups include phenyl groups. In some embodiments, the term "aryl" includes monocyclic or polycyclic (e.g., having 2, 3, or 4 fused rings) aromatic hydrocarbons such as, for example, phenyl, naphthyl, anthracenyl, phenanthrenyl, indanyl, and indenyl.

As used herein, the term "arylene" refers to a linking aryl group.

As used herein, the term "halogen" or "halo" refers to fluoro, chloro, bromo, and iodo groups.

As used herein, the term "polymer" refers to a macromolecule having at least 10 repeating units.

As used herein, the term "oligomer" refers to a molecule having 2 to 9 repeating units.

As used herein, the term "copolymer" refers to a polymer that is the result of polymerization of two or more different monomers. The number and the nature of each constitutional unit can be separately controlled in a copolymer. The constitutional units can be disposed in a purely random, an alternating random, a regular alternating, a regular block, or a random block configuration unless expressly stated to be otherwise. A purely random configuration can, for example, be: x-x-y-z-x-y-y-z-y-z-z-z . . . or y-z-x-y-z-y-z-x-x . . . . An alternating random configuration can be: x-y-x-z-y-x-y-z-y-x-z . . . , and a regular alternating configuration can be: x-y-z-x-y-z-x-y-z . . . . A regular block configuration (i.e., a block copolymer) has the following general configuration: . . . x-x-x-y-y-y-z-z-z-x-x-x . . . , while a random block configuration has the general configuration: . . . x-x-x-z-z-x-x-y-y-y-z-z-z-x-x-z-z-z- . . . .

As used herein, the term "random copolymer" is a copolymer having an uncontrolled mixture of two or more constitutional units. The distribution of the constitutional units throughout a polymer backbone (or main chain) can be a statistical distribution, or approach a statistical distribution, of the constitutional units. In some embodiments, the distribution of one or more of the constitutional units is favored.

As used herein, the term "constitutional unit" of a polymer refers to an atom or group of atoms in a polymer, comprising a part of the chain together with its pendant atoms or groups of atoms, if any. The constitutional unit can refer to a repeating unit. The constitutional unit can also refer to an end group on a polymer chain. For example, the constitutional unit of polyethylene glycol can be —$CH_2CH_2O$— corresponding to a repeating unit, or —$CH_2CH_2OH$ corresponding to an end group.

As used herein, the term "repeating unit" corresponds to the smallest constitutional unit, the repetition of which constitutes a regular macromolecule (or oligomer molecule or block).

As used herein, the term "end group" refers to a constitutional unit with only one attachment to a polymer chain, located at the end of a polymer. For example, the end group can be derived from a monomer unit at the end of the polymer, once the monomer unit has been polymerized. As another example, the end group can be a part of a chain transfer agent or initiating agent that was used to synthesize the polymer.

As used herein, the term "terminus" of a polymer refers to a constitutional unit of the polymer that is positioned at the end of a polymer backbone.

As used herein, the term "cationic" refers to a moiety that is positively charged, or ionizable to a positively charged moiety under physiological conditions. Examples of cationic moieties include, for example, amino, ammonium, pyridinium, imino, sulfonium, quaternary phosphonium groups, etc.

As used herein, the term "anionic" refers to a functional group that is negatively charged, or ionizable to a negatively charged moiety under physiological conditions. Examples of anionic groups include carboxylate, sulfate, sulfonate, phosphate, etc.

As used herein, the term "consisting essentially of" or "consists essentially of" refers to a composition including the components of which it consists essentially as well as other components, provided that the other components do not materially affect the essential characteristics of the composition. Typically, a composition consisting essentially of certain components will comprise greater than or equal to 95 wt % of those components or greater than or equal to 99 wt % of those components.

As used herein, the term "build region" refers to an area in the composition where the polymerization stimulus is applied, such as between a movable build surface the bottom of a transparent container for the composition at the beginning of the additive manufacturing process, or at the air-composition interface. As an example, when the polymerization stimulus is irradiation (e.g., using a light of a given wavelength), the build region refers to the area on the composition where irradiation is applied and its depth can be limited by the penetration of the polymerization stimulus (e.g., irradiation). As another example, a build region can be defined by a movable build surface and the interfacial space between the two immiscible liquids, and the depth of the build region can be limited by the penetration of polymerization stimulus (e.g., irradiation).

Unless otherwise defined, all technical and scientific terms used herein have the same meaning as commonly understood by one of ordinary skill in the art. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The particulars shown herein are by way of example and for purposes of illustrative discussion of embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice. As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize. All of the references cited herein are incorporated by reference. Aspects of the disclosure can be modified, if necessary, to employ the systems, functions, and concepts of the above references and application to provide yet further embodiments of the disclosure. These and other changes can be made to the disclosure in light of the detailed description.

Specific elements of any foregoing embodiments can be combined or substituted for elements in other embodiments. Moreover, the inclusion of specific elements in at least some of these embodiments may be optional, wherein further embodiments may include one or more embodiments that specifically exclude one or more of these specific elements. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Polymerization Methods

In some embodiments, the composition of the methods of the present disclosure can be a homogeneous mixture or a heterogeneous mixture (e.g., an immiscible bilayer).

The composition can include a suspension (e.g., in the homogeneous mixture, or in one or more components of the heterogeneous mixture). In some embodiments, the composition is heated (e.g., while the three-dimensional article is manufactured). In other embodiments, the system is cooled (e.g., while the three-dimensional article is manufactured).

In some embodiments, the two or more types of polymerizable monomers are independently selected from monomers which undergo radical polymerizations, monomers which undergo cationic polymerizations, and monomers which undergo anionic polymerizations. In some embodiments, the two or more types of polymerizable monomers are independently selected from acrylate monomers (e.g., alkyl acrylates such as methacrylate monomers, esters of acrylic acid, salts of acrylic acid, conjugate bases of acrylic acids, and/or derivatives thereof), acrylic acid monomers, epoxy monomers, thiol monomers, vinyl monomers (e.g., styrenic monomers), vinyl amide monomers, vinyl ester monomers, silyl hydride monomers, and vinyl ether monomers. For example, the two or more types of polymerizable monomers can be independently selected from 2-hydroxyethyl acrylate, N-i sopropylacrylamide, (+/−)-epichlorohydrin, (+/−)-propylene oxide, butyl acrylate, tert-butyl acrylate, 2-(2-ethoxyethoxy) ethyl acrylate, isobornyl acrylate, cyclohexene oxide, dimethylacrylamide, Ebecryl 8413, methyl methacrylate, methyl acrylate, 2-hydroxyethyl methacrylate, ethyl acrylate, and 4-vinyl-1-cyclohexene 1,2-epoxide. The composition can include each type of polymerizable monomers in an amount of 10 percent by weight or more (e.g., 20 percent by weight or more, 30 percent by weight or more, 40 percent by weight or more, 50 percent by weight or more, 60 percent by weight or more, 70 percent by weight or more, or 80 percent by weight or more) and/or 90 percent by weight or less (e.g., 80 percent by weight or less, 70 percent by weight or less, 60 percent by weight or less, 50 percent by weight or less, 40 percent by weight or less, 30 percent by weight or less, or 20 percent by weight or less), relative to the total composition, so long as the total percent by weight of the components of the total composition is 100 percent by weight. The ratio of the types of monomers can vary based upon the intended purpose of the polymeric article to be manufactured, the properties of the resulting polymers, and the rates of polymerization of the various sets of monomers. For example, the composition can include 50 percent by weight of an acrylate monomer and 50 percent by weight of an epoxy monomer. As another example, the composition can include 40 percent by weight of an acrylate monomer and 60 percent by weight of an epoxy monomer; or 30 percent by weight of an acrylate monomer and 70 percent by weight of an epoxy monomer.

In some embodiments, a composition includes 60 weight percent 2-(2-ethoxyethoxy) ethyl acrylate and 40 weight percent 2-hydroxyethyl acrylate (HEA). In certain embodiments, a composition includes HEA, butyl acrylate, and bis(propylacrylamide)poly(dimethylsiloxane) (PDMSD-MAA), and the resulting polymer can be used for mechanophore activation, such as spiropyran activation by altering the composition. In some embodiments, a composition includes 72% butyl acrylate, 20% HEA, 8% PDMSDMAA, 0.25 wt % Irgacure 819, and 0.25 wt % spiropyran DMAA.

The resulting polymer can both UV and mechanical activation to a merocyanine form, and the polymer can revert back to the closed spiropyran form under ambient light, while storing the polymer in a dark or enclosed environment provides the merocyanine form. In some embodiments, the composition includes Ebecryl 8413 and butyl acrylate (20 percent by weight and 80 percent by weight, respectively). The composition can cure to a polymer that has a higher elongation than many elastomeric resins and can have an elevated spiropyran activation energy. In some embodiments, a composition includes a 50 percent by weight of cationic monomers and 50 percent by weight of radical polymerizable monomers. The cationic monomers in turn can include 70 percent by weight of epoxycyclohexylmethyl-3,4-epoxycyclohexanecarboxylate (EPDX), and 30 percent by weight of cyclohexene oxide. The radical polymerizable monomers in turn can include 90 percent by weight of HEA and 10 percent by weight of a diacrylate crosslinker, such as 1,6-hexanediol dimethacrylate (HDDA). In some embodiments, a curing time for a resulting polymer can be tuned depending on its constituent monomers. Example polymers and compositions are provided below in the Examples section.

In some embodiments, the composition (e.g., the first liquid layer, the second liquid layer, or both) includes a monomer of Formula (I)

$$CH_2=CR^1-COR^2(CH_2)_n-OH \qquad (I)$$

wherein:
R$^1$ is H or methyl,
R$^2$ is O or NR$^3$, wherein R$^3$ is H, alkyl, or aryl, and
n is an integer selected from 1 to 10.
In some embodiments, R$^1$ is H.
In some embodiments, R$^1$ is methyl.
In some embodiments, R$^2$ is O.
In some embodiments, R$^2$ is NR$^3$, wherein R$^3$ is H or alkyl.
In some embodiments, R$^2$ is NH.
In some embodiments, R$^2$ is NCH$_3$.
In some embodiments, R$^3$ is H or alkyl.
In some embodiments, R$^3$ is H.
In some embodiments, R$^1$ is H and R$^2$ is O.
In some embodiments, n is 2.
In some embodiments, n is an integer selected from 2 to 6.
In some embodiments, n is an integer selected from 2 to 4.
In some embodiments, the monomer of Formula (I) is 2-hydroxyethyl acrylate.

In some embodiments, polymers made (fully or partially) from monomers of Formula (I) are soft, flexible, and elastic materials that require little to no post-processing (e.g., a secondary curing step to achieve elastomeric properties in the polymer). The polymers that are made (fully or partially) from monomers of Formula (I) can have low viscosity, can be made opaque or transparent, and can be printed in the presence of oxygen with light intensities found in widely available and relatively low-cost projector systems. Furthermore, polymer made (fully or partially) from monomers of Formula (I) can produce consistent material properties that are independent to print orientation. This level of consistency is not commonly observed in additive manufacturing processes which tend to be mired by insufficient interdigitation between layers and highly variable material properties between prints. The polymer compositions can be modified to adjust the resulting physical properties of the end material without greatly hindering printability. For example, the polymer compositions can contain tunable properties such as tensile modulus, storage modulus, elongation at break, shore hardness, solvent resistance, opacity, and more.

In some embodiments, when the polymer is made from monomers that include 2-hydroxyethyl acrylate (HEA) and/or its derivatives, the polymer, the resulting polymer has elastomeric regions. HEA and/or its derivatives can undergo radical-initiated photopolymerization. However, HEA acts differently from most acrylic monomers through the presence of the hydroxy functional group which is a hydrogen bonding moiety. Without wishing to be bound by theory, it is believed that the termination rate of radical polymerization can be greatly reduced by the effect of hydrogen bonding in hydroxyalkyl (HO-alkyl-) acrylates. This, combined with potential for hydrogen bonding to the carbonyl of an acrylate molecule (which could alter the electron density of the acrylate double bond and increase the rate of propagation), are believed to provide rapid polymerization and access to higher molecular weight polymers. This rapid polymerization helps to counter the deleterious effects of termination events from the presence of oxygen. HEA and other hydroxyalkyl acrylates can also undergo a chain transfer mechanism in which a hydrogen at the a-carbon next to the hydroxyl group is abstracted, leaving a carbon centered radical that can reinitiate and create a cross-linking event. In some embodiments, the chain-transfer mechanism provides a light cross-linking effect to most polymerizations involving hydroxyalkyl acrylates which is consistent with degrees of crosslinking in other elastomer systems.

Hydrogen bonding in the polymerized material can provide benefits for additive manufacturing. The hydrogen bonding provides associative forces which allow the photoresin to solidify and hold shape at lower conversions than would otherwise be possible. This is useful for additive manufacturing processes which rely on quick solidification times to be able to produce objects in a timely manner. These associative forces can provide structural stability under duress, leading to high elongations at break (e.g., up to 300 percent elongation at break, up to 400 percent elongation at break, up to 450 percent elongation at break, or up to 500 percent elongation at break). In this manner, the hydrogen bonding forces can dissipate energy in a material as it is deformed by constantly breaking and reforming. This decreases the energy available to potentially break covalent bonds in the polymer chain as it moves and adjusts under force of elongation.

In some embodiments, the composition of the aforementioned methods (e.g., the first liquid layer, a second liquid layer, or both) further includes one or more types of crosslinking agents. Examples of crosslinking agents include trimethylolpropane triacrylate (TMPTA), ethylene glycol diacrylate, 1,6-hexanediol dimethacrylate (HDDA), epoxycyclohexylmethyl-3,4-epoxycyclohexanecarboxylate (EPDX), poly (dimethyl siloxane) dimethacrylamide, poly (dimethyl siloxane) acrylamide, poly (ethylene glycol) diacrylate, bisphenol A glycerolate (1-glycerol/phenol) diacrylate, di(ethylenegly col) diacrylate, pentaerythritol tetraacrylate, 1,1,3,3-tetramethyl-1,3-bis[2-(7-oxabicyclo[4.1.0]hept-3-yl)ethyl]-disiloxane, and/or diethyleneglycol diacrylate. The composition can include each type of crosslinking agent in an amount of 5 percent by weight or more (e.g., 10 percent by weight or more, 15 percent by weight or more, 20 percent by weight or more, 30 percent by weight or more, or 40 percent by weight or more) and/or 50 percent by weight or less (e.g., 40 percent by weight or less, 30 percent by weight or less, 20 percent by weight or less, 15 percent by weight or less, or 10 percent by weight or less)

relative to the total composition, so long as the total percent by weight of the components of the total composition is 100 percent by weight. For example, in some embodiments, the composition includes 5 to 15 percent by weight of the crosslinking agent(s). In some embodiments, the crosslinker amount is different depending on the monomer to be crosslinked. For example, an epoxide polymer can be highly crosslinked (e.g., 40 percent by weight crosslinker) while an acrylate polymer can be crosslinked to a smaller degree (e.g., 20 percent by weight crosslinker).

In some embodiments, the two or more types of polymerization initiators are photoinitiators. In some embodiments, one or more types of polymerization initiators include photothermal initiators (e.g., croconaine dyes) and/or photolabile groups (e.g., protected amines, phosphates, carboxylates, carbonates, carbamates, thiolates, phenolates, and/or alkoxides). The photoinitiators can be each independently selected from phosphine oxide and phenyl bis (2,4, 6-trimethyl benzoyl, a triarylsulfonium hexafluoroantimonate salt, 4-isopropyl-4'-methyldiphenyliodonium tetrakis (pentafluorophenyl) borate, H-Nu 660, H-Nu 640, a carbocyanine alkyltriphenyl borate salt, (η6-carbazole) 5-cyclopentadienyl) iron hexafluorophosphate, (η6-chlorobenzene) (η5-cyclopentadienyl) iron hexafluorophosphate, (η6-alkylcarbazole) (η5-cyclopentadienyl) iron hexafluorophosphate, H-Nu 254, a diphenyl iodonium salt, and an alkyltriphenyl borate salt. The composition can include each polymerization initiator in an amount of 0.2 percent by weight or more (e.g., 0.5 percent by weight or more, 1 percent by weight or more, 2 percent by weight or more, 3 percent by weight or more, 4 percent by weight or more, or 5 percent by weight or more) and/or 6 percent by weight or less (e.g., 5 percent by weight or less, 4 percent by weight or less, 3 percent by weight or less, 2 percent by weight or less, 1 percent by weight or less, or 0.5 percent by weight or less), relative to the total composition, so long as the total percent by weight of the components of the total composition is 100 percent by weight.

In some embodiments, the composition (e.g., the first liquid layer, a second liquid layer, or both) can further include one or more photosensitizers. For example, the one or more photosensitizers can be independently selected from 2-ethyl-9,10-dimethoxyanthracene, anthracene, chlorophyll, camphorquinone, and derivatives thereof. The composition can include each photosensitizer in an amount of 0.1 percent by weight or more (e.g., 0.5 percent by weight or more, 1 percent by weight or more, or 2 percent by weight or more) and/or 3 percent by weight or less (e.g., 2 percent by weight or less, 1 percent by weight or less, 0.5 percent by weight or less), relative to the total composition, so long as the total percent by weight of the components of the total composition is 100 percent by weight.

In some embodiments, the composition (e.g., the first liquid layer, the second liquid layer, or both) includes a pigment selected from titanium dioxide, carbon black, an organic ultraviolet light absorber, an organic visible light absorber, graphene, carbon nanotubes, and any combination thereof. The pigment can be present in an amount of 0.001 percent by weight or more (e.g., 0.01 percent by weight or more, 0.1 percent by weight or more, 1 percent by weight or more, 2 percent by weight or more, 3 percent by weight or more, 4 percent by weight or more, 5 percent by weight or more, 6 percent by weight or more, 7 percent by weight or more, 8 percent by weight or more, or 9 percent by weight or more) and/or 10 percent by weight or less (e.g., 9 percent by weight or less, 8 percent by weight or less, 7 percent by weight or less, 6 percent by weight or less, 5 percent by weight or less, 4 percent by weight or less, 3 percent by weight or less, 2 percent by weight or less, 1 percent by weight or less, 0.1 percent by weight or less, or 0.01 percent by weight or less), relative to the composition, so long as the total percent by weight of the components of the total composition is 100 percent by weight.

In some embodiments, the composition (e.g., a first liquid layer and/or a second liquid layer) includes ionic liquids, organic liquids, aqueous liquids, salts, high-viscosity liquids that are miscible with one another, high-density liquids that are miscible with one another, particles (e.g., silica, clay, iron, and/or ceramic oxides), dyes (e.g., nile red and/or methylene blue), polymers (e.g., non-interfering polymers such as poly(3,4-ethylenedioxythiophene) and/or poly(vinylpyrrolidone)), surfactants (e.g., cetrimonium bromide), biological agents (e.g., DNA, RNA, algae, yeast), and combinations thereof.

In some embodiments, the ionic liquids, organic liquids, aqueous liquids, salts, high-viscosity liquids that are miscible with one another, and/or high-density liquids that are miscible with one another are each independently present in an amount of 30 percent by weight or more (e.g., 40 percent by weight or more, 50 percent by weight or more, or 60 percent by weight or more) and/or 70 percent by weight or less (e.g., 60 percent by weight or less, 50 percent by weight or less, or 40 percent by weight or less), relative to the total composition, so long as the total percent by weight of the components of the total composition is 100 percent by weight.

In some embodiments, the particles (e.g., silica, clay, iron, and/or ceramic oxides), dyes (e.g., nile red and/or methylene blue), polymers (e.g., non-interfering polymers such as poly(3,4-ethylenedioxythiophene) and/or poly(vinylpyrrolidone)), surfactants (e.g., cetrimonium bromide), biological agents (e.g., DNA, RNA, algae, yeast) are each independently present in an amount of 1 percent by weight or more (e.g., 2 percent by weight or more, 5 percent by weight or more, 10 percent by weight or more, 20 percent by weight or more, 30 percent by weight or more, or 40 percent by weight or more) and/or 50 percent by weight or less (e.g., 40 percent by weight or less, 30 percent by weight or less, 20 percent by weight or less, 10 percent by weight or less, 5 percent by weight or less, or 2 percent by weight or less), relative to the total composition, so long as the total percent by weight of the components of the total composition is 100 percent by weight. For example, a biological agent or a non-interfering polymer can present in an amount of 50 percent by weight or less relative to the total composition. As another example, particles can be present in an amount of 20 percent or less relative to the total composition.

In some embodiments, the first liquid layer includes ionic liquids, organic liquids, aqueous liquids, salts, high-viscosity liquids that are miscible with one another, high-density liquids that are miscible with one another, particles (e.g., silica, clay, iron, and/or ceramic oxides), dyes (e.g., nile red and/or methylene blue), non-interfering polymers (e.g., poly (3,4-ethylenedioxythiophene) and/or poly(vinylpyrrolidone), surfactants (e.g., cetrimonium bromide), biological agents (e.g., DNA, RNA, algae, yeast), and any combination thereof.

In some embodiments, the second liquid layer includes organic solvents (e.g., propylene carbonate and/or toluene), particles (e.g., silica, clay, iron, and/or ceramic oxides), dyes (e.g., nile red and/or methylene blue), surfactants (e.g., cetrimonium bromide), biological agents (e.g., DNA, RNA, algae, yeast), photoinitiators (e.g., as described above), photosensitizers (e.g., as described above), and any combination thereof.

In some embodiments, the first liquid layer described above has a higher density compared to the second liquid layer. In some embodiments, the second liquid layer described above has one or more monomers. In some embodiments, the liquid layer of higher density (e.g., the first liquid layer) includes a photoinitiator and/or photosensitizer that contributes to polymerization only at the liquid-liquid interface, and can provide polymerization control depending on the application of the polymerization stimulus (e.g., at varying wavelengths of irradiation). The first liquid layer can be located under the second liquid layer.

In some embodiments, the one or more polymerization stimuli are independently selected from light and heat. For example, the temperature can be 20° C. or more (e.g., 40° C. or more, 60° C. or more, 80° C. or more, 100° C. or more, 125° C. or more, 150° C. or more, or 175° C. or more) and/or 200° C. or less (e.g., 175° C. or less, 150° C. or less, 125° C. or less, 100° C. or less, 80° C. or less, 60° C. or less, or 40° C. or less). The one or more polymerization stimuli are independently selected from light having a predetermined wavelength. For example, the light can have a wavelength of 300 nm or more (e.g., 400 nm or more, 500 nm or more, 600 nm or more, 700 nm or more, or 800 nm or more) and/or 900 nm or less (e.g., 800 nm or less, 700 nm or less, 600 nm or less, 500 nm or less, or 400 nm or less). In some embodiments, the light has a wavelength of 320 nm to 700 nm. For example, ultraviolet (UV) light can be used to activate acrylate and epoxy photoinitiators. As another example, light having two different visible wavelengths can be used to active the photoinitators (e.g., red light for an acrylate system and blue light for a system with anthracene-derived photosensitizers and epoxy monomers). In some embodiments, light having infrared wavelengths can be used for photothermal dyes. The light having a predetermined wavelength can a predetermined pattern at the build region.

The predetermined pattern can correspond to a given cross-section of an article to be manufactured. The build region can be exposed to each polymerization stimulus for a given predetermined duration, for example, a duration of 0.1 second or more (e.g., 1 second or more, 3 seconds or more, 5 seconds or more, 7 seconds or more, 10 seconds or more, 15 seconds or more, 20 seconds or more, 30 seconds or more, 50 seconds or more, 70 seconds or more, or 90 seconds or more) and/or 100 seconds or less (e.g., 90 seconds or less, 70 seconds or less, 50 seconds or less, 30 seconds or less, 20 seconds or less, 15 seconds or less, 10 seconds or less, 7 seconds or less, 5 seconds or less, 3 seconds or less, or 1 second or less). In some embodiments, for an acrylate monomer with Irgacure 819, the build region is exposed to irradiation for 6 to 24 seconds. In some embodiments, for H-Nu photoinitiators, the duration of irradiation can vary depending on the monomer and/or the addition of borate salts. In certain embodiments, epoxy monomers and the appropriate photoinitiators (e.g., EPDX and (+/−)-epichlorohydrin) are polymerized with UV light for a duration of 1 to 8 minutes (e.g., 2 to 8 minutes, 4 to 8 minutes, or 6 to 8 minutes) to provide a desired hardness. In some embodiments, cyclohexene oxide and EPDX are polymerized with a ratio of 1:1 cyclohexene oxide to EPDX in 40 seconds.

In some embodiments, one or more patterned polymerization stimuli (e.g., irradiation of different wavelengths of light) are applied to the composition such that some parts of the irradiation pattern provide solid polymer resulting from polymerization of only one monomer type, with different wavelengths of light corresponding to different monomer types and a mixture of wavelengths used to form solid polymer of multiple types in the build region.

In some embodiments, irradiation (e.g. UV or visible light), which can change pattern over time, is directed onto the build region so as to form a solid polymer layer on the movable build surface while advancing the movable build surface away from the liquid-liquid interface in a step-wise fashion to form a three-dimensional object out of sequentially deposited solid polymer layers.

In some embodiments, parts of the patterned irradiation are directed for differing amounts of time before advancing the movable build stage. For example, parts of the irradiation pattern can provide solid polymer resulting from polymerization of faster-polymerizing monomer type(s), and parts of the irradiation pattern can provide solid polymer resulting from the polymerization of all monomer types, and/or some parts of the irradiation pattern can provide solid polymer comprised of mixtures of monomer types in a given manufactured article.

In some embodiments, the composition can include components that can rapidly self-assemble or undergo directed-assembly at the build region (e.g., an air-liquid interface, or a liquid-liquid interface). The assembly can include a biological assembly, block copolymers, two-dimensional lattices, a nanoparticle assembly, two-dimensional networks, and/or mixtures (binary and greater) of microscopically immiscible materials which are pattern transferrable to a manufactured three-dimensional article.

In some embodiments, the two or more types of monomers form a microphase separation at the build region. As used herein, microphase separation refers to a phenomenon generated by incompatible chemical components where the components spontaneously form phase-separated regions visible on microscopic length scales. Example morphologies of microphase-separated structures include materials with lamellar, spherical, cylindrical, and gyroid domains. In some embodiments, by exposing the build region to a polymerization stimulus that is tailored to one type of monomer and its corresponding polymerization initiator, the method can include selectively polymerizing one type of monomers in a build region. The remaining types of monomers can be polymerized after the first type of monomer is polymerized. In some embodiments, the two or more types of monomers can be concurrently polymerized by exposing each type of monomer and their corresponding polymerization initiator to one or more polymerization stimuli that is configured to polymerize the monomers.

In some embodiments, the method includes repeating steps (b)-(d) to provide the three-dimensional article. The three-dimensional article can include a heterogeneous distribution of the two or more integrally mixed polymers. The three-dimensional article can have a heterogeneous distribution of mechanical and chemical properties. As used herein, the term "integral" or "integrally" refers to a component that is intimately mixed with another component, such that the integrally mixed components form a whole that cannot be separated by mechanical means such as pulling and peeling.

In some embodiments, while building the three-dimensional article using the methods of the present disclosure, the three-dimensional article is attached to a build surface, for example, via the first polymerized layer. The build surface can be an aluminum substrate, a plastic substrate, a glass substrate, stainless steel, wood, painted materials, or any combination thereof. In some embodiments, the build surface is moved away from the build region subsequent to, or concurrent with, polymerizing the two or more types of monomers at the build region.

The composition is provided in a container, which can have a light-permeable area. For example, the composition can be in an optically transparent, open-topped container. The method can further include providing a light source, such as a data light processing device or a laser.

The polymers of the present disclosure can be used in the manufactures of articles in fields such as soft robotics, flexible electronics, biomimetic structures, and wearable devices.

Table 1 presents some exemplary combinations of photosensitizers, photoinitiators, monomers, and crosslinkers that can be used in the compositions of the methods of the present disclosure. In Table 1, compound(s) in column 3 (Monomers) and (Crosslinkers) can be mixed with the compound(s) listed in Column 1 (Photosensitizers) and 2 (Photoinitiators/co-initiators), in any combination.

tiator, while both typically remain in the UV to visible light region. The transparent container and the build surface are leveled and the build surface is lowered to just above the build region. Vat photopolymerization includes directing patterned irradiation at the build region whilst the build surface moves upwards. Irradiation parameters can spatially designate the composition of the resulting printed object from solely the cationic polymer to solely the radical polymer or any percentage mixture of the two by programming which wavelength of light is shown in each location along the irradiation pattern.

Example 2

Polymerization of Cationic Monomers and Radical-Polymerizable Monomers

One or multiple cationically photopolymerized monomers, a correlating cationic photoinitiator, one or multiple

TABLE 1

Exemplary combinations of photosensitizers, photoinitiators, monomers, and crosslinkers

| Photosensitizers | Photoinitiators/Co-initiators | Monomers | Crosslinkers |
| --- | --- | --- | --- |
| 2-ethyl-9,10-dimethoxyanthracene | Irgacure 819 (Phosphine oxide, phenyl bis (2,4,6-trimethyl benzoyl)) | 2-hydroxyethyl acrylate (HEA) | trimethylolpropane triacrylate (TMPTA) |
| anthracene | Triarylsulfonium hexafluoroantimonate salts, mixed (TAS) | N-isopropylacrylamide | ethylene glycol diacrylate |
| alkyltriphenyl borate salts | 4-isopropyl-4'-methyldiphenyliodonium Tetrakis (pentafluorophenyl) borate | (+/−)-epichlorohydrin | 1,6-hexanediol dimethacrylate (HDDA) |
| | H-Nu 660 and 640 and other carbocyanine alkyltriphenyl borate salts | (+/−)-propylene oxide | 3,4-epoxycyclohexylmethyl-3,4-epoxycyclohexanecarboxylate (EPOX) |
| | (η6-carbazole) (η5-cyclopentadienyl) iron hexafluorophosphate | butyl acrylate | poly (dimethyl siloxane) dimethacrylamide |
| | (η6-chlorobenzene) (η5-cyclopentadienyl) iron hexafluorophosphate | tert-butyl acrylate | poly (dimethyl siloxane) acrylamide |
| | (η6-alkylcarbazole) (η5-cyclopentadienyl) iron hexafluorophosphate | 2-(2-ethoxyethoxy) ethyl acrylate | poly (ethylene glycol) diacrylate |
| | H-Nu 254 and other diphenyl iodonium salts | isobornyl acrylate | bisphenol A glycerolate (1 glycerol/phenol) diacrylate |
| | alkyltriphenyl borate salts | cyclohexene oxide | di(ethyleneglycol) diacrylate |
| | | N,N'-dimethylactylamide | pentaerythritol tetraacrylate |
| | | Ebecryl 8413 | 1,1,3,3-tetramethyl-1,3-bis[2-(7-oxabicyclo[4.1.0]hept-3-yl)ethyl]-disiloxane |
| | | methyl methacrylate | diethyleneglycol diacrylate |
| | | methyl acrylate | |
| | | 2-hydroxyethyl methacrylate | |
| | | ethyl acrylate | |
| | | 4-vinyl-1-cyclohexene 1,2-epoxide | |

Example additive manufacturing procedures and compositions are provided in Examples 1-9 below.

EXAMPLES

Example 1

Polymerization of Cationic Monomers and Radical-Polymerizable Monomers

One or multiple cationically photopolymerized monomers, a corresponding cationic photoinitiator, one or multiple radical-based photopolymerization monomers, and a corresponding radical photoinitiator, are thoroughly mixed into a transparent container in an equal mixture by weight. The radical photoinitiator responds to a wavelength of light at a wavelength different than that of the cationic photoiniradical-based photopolymerization monomers, and a correlating radical photoinitiator are thoroughly mixed into a transparent container in an equal mixture by weight. The radical and cationic photoinitiators respond to a similar wavelength of light, for example in the UV to visible light region. The transparent container and the build surface are leveled and the build surface is lowered to just above the build region. Vat photopolymerization includes directing patterned irradiation at the build region whilst the build surface moves upwards. Irradiation parameters set by the user would be able to spatially designate the composition of the resulting printed object from solely the radical polymer to an equal mixture of cationic and radical polymer or any percentage in between by programming the length of time of which irradiation is shown in each location along the irradiation pattern, using a minimum time to polymerize the radically polymerized monomers and more time to polymerize the cationically photopolymerized monomers as desired.

Example 3

Polymerization of Polyurethane Diacrylate Oligomer and Epoxycyclohexylmethyl 3,4-Epoxycyclohexanecarboxylate 5 g of a polyurethane diacrylate oligomer combined with 5 g of 3,4-epoxycyclohexylmethyl 3,4-epoxycyclohexanecarboxylate, 0.1 g Irgacure 819 radical photoinitiator, 0.2 g triarylsulfonium hexafluoroantimonate cationic photoinitiator, and 0.2 g 2-ethyl-9,10-dimethoxyanthracene photosensitizer is mixed together and placed in a 60 mm petri dish lined with Sylgard 184. This petri dish is placed on a leveled print bed of a DropLit DLP printer with a leveled build surface. The desired digital three-dimensional object file is sliced into image files with a programmable array of values that dictate the length of time each pixel is irradiated. The minimum exposure time is set at 12 seconds, the maximum exposure time is set at 2 minutes, the wait time between exposure is 6 seconds, the lift distance is 2 mm, the lift and retract speed are 50 mm/min, and the layer thickness is 0.1 mm. The build surfaced is lowered to just above the build region and the print is commenced using an Optoma HD20 with the UV-filter removed as a light source.

Example 4

Two-Layer Polymerization Procedure

An aqueous solution with a salt is provided with an immiscible monomer resin-comprising solution of lower density, a photoinitiator, and co-solvent. Each liquid formulation is combined with their respective additives and mixed to ensure even dispersion. An optically transparent container is filled with the higher density liquid such that the bottom of the container is fully covered. The lower density monomer resin-comprising liquid is then added to cover the higher density liquid. More volume can be added to the corresponding layer to the desired three-dimensional object being fabricated. The optically transparent container and build surface are leveled and the build surface is lowed to just above the liquid-liquid interface. Vat photopolymerization includes directing patterned irradiation at the build region.

Example 5

Two-Layer Polymerization Procedure 1.5 g of toluene co-solvent is combined with 0.06 g of Irgacure 819 photoinitiator and 1 mg of Nile Red dye and stirred briefly. This solution is added to 3 g of Gelest RMS-033 resin and stirred vigorously for 10 minutes. 10 mL of brine is placed in a 60 mm petri dish so as to completely cover the bottom. Using a pipette, the resin containing mixture is added on top of the brine so as to completely cover it. This petri dish is placed on a leveled print bed of a DropLit DLP printer with a leveled build surface. The desired digital three-dimensional object file is sliced using the Creation Workshop program such that the exposure time is 10 seconds, the wait time between exposure is 5 seconds, the lift distance is 1 mm, the lift and retract speed are 50 mm/min, and the layer thickness is 0.1 mm. The build surfaced is lowered to just above the liquid-liquid interface and the print is commenced using an Optoma HD20 with the UV-filter removed as a light source.

Example 5

HEA-Containing Composition Polymerization Procedure UV-Visible Light System

Instruments Used:
  Black acer projector X1161P
  Blak-Ray B-100 AP/R High Intensity UV Lamp. 100-watt 365 nm
Resin Composition:
  1:1 EPDX to HEA-Monomer
  0.5 wt % Irgacure 819
  2 wt % TAS (4 wt % from the bottle because it is 50 wt % in propylene carbonate)
Procedure (UV Light Irradiation First)
  A 10 g solution of the proposed resin was first made in a 20 mL vial. Irgacure 819 was weighed out first and dissolved in HEA, followed by EPDX and TAS. The resin was placed in a rectangular mold, with aluminum foil covering half the mold, and irradiated with UV light for 6-8 minutes until the half rectangle felt hard to the touch. The uncured portion of the rectangle was then irradiated with white visible light for 1 minute to create a hard-soft rectangle. The rectangles produced in this fashion were soaked in methanol three for 5 minutes each.
Alternative Procedure (Visible Light Irradiation First)
  A 10 g solution of the proposed resin was made in a 20 mL vial. Irgacure 819 was weighed out first and dissolved in HEA, followed by EPDX and TAS. The resin was placed in a rectangular mold and irradiated the whole rectangle for 1 minute with white visible light. Half the resulting soft, stretchy rectangle was wrapped in aluminum foil before irradiating the uncovered half with UV light for 6-8 minutes. The hard-soft rectangles were soaked in methanol three times for 5 minutes each soaking.
Durometer Readings Based on Shore Hardness A
  Soft regions 33-40 (e.g., a Shore Hardness A suitable for rubber band or pencil eraser)
  Hard regions 85-93 (e.g., a Shore Hardness A suitable for shoe heel or shopping wheel cart)

Example 6

Polymerization Procedure Using a Dual Visible Light System (Red and Blue Light)

Instruments
  Black Acer Projector X1161P
  SeeMeCNC Droplit 3D Printer
Resin Composition
  1 wt % 2-ethyl-9,10-dimethoxyanthracene
  2 wt % 4-isopropyl-4'-methyldiphenyliodonium Tetrakis (pentafluorophenyl) borate
  2 wt % TAS (4 wt % from the bottle because it is 50 wt % in propylene carbonate)
  0.5 wt % H-Nu 660
  0.1 g (+/−)-epichlorhydrin
  0.1 g EPDX
  0.2 HEA
Procedure
  A 0.4 g solution of the resin above is made in a 7 mL vial. All photosensitizers and photoinitiators are weight out, then (+/−)-epichlorohydrin is added to help solubilize the solids.

The final amounts of EPDX and HEA are added before shaking to help homogenize the solution. A Digital Light Processing set-up is used with a Black Acer projector (~20-30 klx for red and blue light), and the resin is irradiated in a small vat lined with PDMS. The materials are soaked in methanol to leach out residual monomers.

Example 7

Polymerization Procedure Using Orthogonal Dual Visible Light System (Red and Blue Light)

Instruments Used
  Black Acer Projector
  SeeMeCNC Droplit Acer Projector
Resin Composition
  0.25 wt % H Nu 640
  0.25 wt % alkyltriphenyl borate salt co-initiator Borate V
  1 wt % (η6-chlorobenzene) (η5-cyclopentadienyl) iron hexafluorophosphate salt
  0.3 g EPDX
  0.1 g (+/−)-epichlorhydrin
  0.35 g HEA
  0.05 g HDDA
Procedure
  0.8 g of resin is prepared and placed in a miniature vat lined with PDMS. An aluminum base plate is placed into that vat, and 100-micron layers are made by irradiating with red and/or blue light images for 10-60 seconds. Light intensities of 20-50 klx are used for the red and blue images. After printing, the object is soaked in methanol three times for 5 minutes each to remove any unreacted monomer.

Example 9

Polymerization of a HEA-Containing Composition

Hydroxyethyl acrylate was purchased from ACROS Organics. Nile Red and 2-(2-ethoxyethoxy)ethyl acrylate were purchased from TCI America. Butyl acrylate, cetyltrimethylammonium bromide, and bis(2,4,6-trimethylbenzoyl)-phenylphosphineoxide where purchased from Sigma-Aldrich. Bis(propylamine)poly(dimethylsiloxane) of molecular weight 5,000 g/mol was purchased from Gelest. All monomers were used as purchased without further purification. Sylgard 184 Silicone Elastomer Base and Curing Agent were purchased from Dow Corning, mixed in a 10:1 ratio, and cured at 65° C. for an hour to cover the bottom of Pyrex petri dishes used as vat photopolymerization containers. The photoresin G+ White was purchased from MakerJuice Labs. Food coloring was purchased from The Kroger Company and used as a dye in certain resin formulations. Instrumentation: 1H NMR spectra were recorded on a Bruker AVance 500 MHz spectrometer. Tetramethylsilane using the residual protio-solvent was used as an internal standard (CDCl3, 1H: 7.26 ppm).

Tensile elongation was conducted according to ASTM D638 using type V specimen samples. Testing was accomplished with an Instron 5585H Universal Testing System equipped with a 50 N load frame, pneumatic grips, and Bluehill 3 software. Elongation was conducted at a 100 mm/min extension rate and an Instron 2663-821 Advanced Video Extensometer was used to track strain. Light intensity of projectors used for vat photopolymerization was measured using an Extech Instruments light meter (model HD450). Durometer measurements were taken in triplicate and reported as averages using a PCE Instruments PCE-DD-A Shore A Durometer. Rheology measurements were taken on a TA Instruments Discovery HR-2 hybrid rheometer using a stainless steel 20 mm Peltier plate. GC/MS measurements were accomplished with a combined Hewlett Packard 5973 Mass Selective Detector and HP 6890 Series GC System using an Agilent 7683 Series Injector.

Vat Polymerization

Objects were printed using a SeeMeCNC Droplit DLP 3D Printer (the build and vat plates were modified to accommodate leveling) and an Acer X1161P projector. The multimaterial gripper was printed using an Optoma HD20 with the UV filter removed and the brightness decreased to 40% (via projector menu). The polymerization setup is as described, for example, in FIG. 3. Creation Workshop (version 1.0.0.75) software was used to operate/control the printer and projector as well as convert 3D model files (STL format) constructed in house using Google Sketchup (version 17.1.174) into image stacks for printing. The build vat consisted of a Pyrex petri-dish (d=90 mm) with a layer of silicon elastomer (ca. 11 g of silicon applied to dish). Prints were conducted by repeating the process of projecting an image into the resin followed by raising the z-stage (FIGS. 3 and 4). The print parameters used for each material are recorded in the Resin Composition and Printer Settings section of the supplementary information. Post-print parts were subjected to an excess of white light at printing intensity for 30 seconds per side.

Biphasic Vat Polymerization

Objects printed using a biphasic system were printed using a system illustrated in FIG. 4. The build vat was a 400 mL Pyrex beaker with the top removed (inner diameter=73 mm, height=87 mm). The bottom sidewall of this beaker was lined with a thin layer of poly(hydroxyethylacrylate) so as to eliminate contact between the resin and glass as it was found that the attraction between the two could push and partition away the bottom layer of liquid. This beaker was filled with 30 mL of brine and the build stage was leveled to the top surface of this liquid layer. The printing process then continued as normal.

Figure 5:
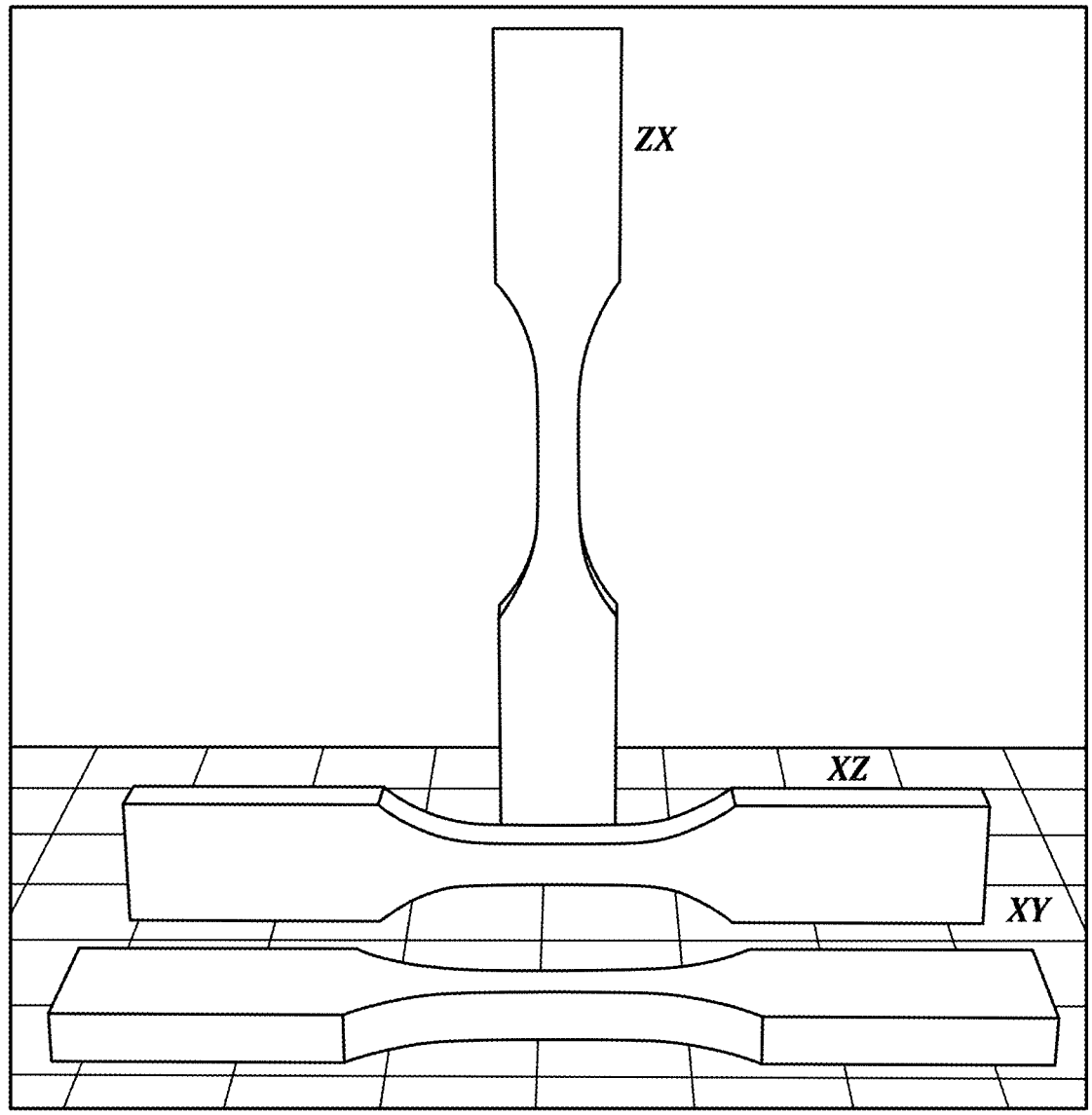
FIG. 5 is an illustration of printing orientations of embodiments of dogbone-shaped article.
Figure 6A:
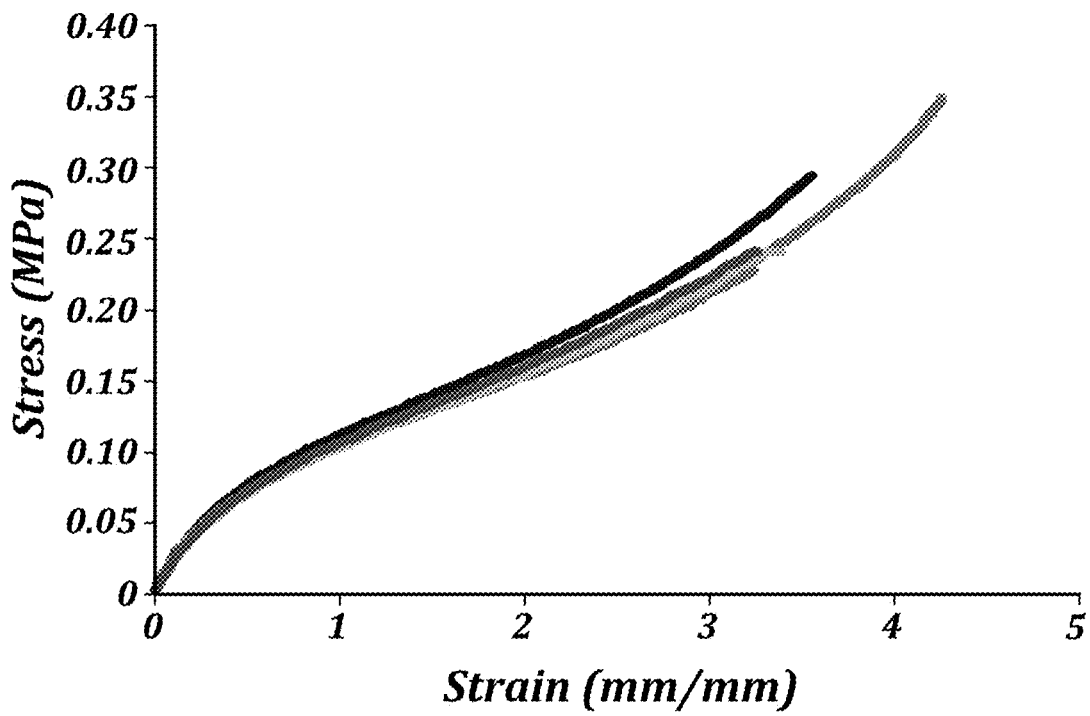
FIG. 6A is a graph of the tensile elongation of ThrashOH-flex (1%) XY ASTM D638 Type V dogbone specimens.
Figure 6B:
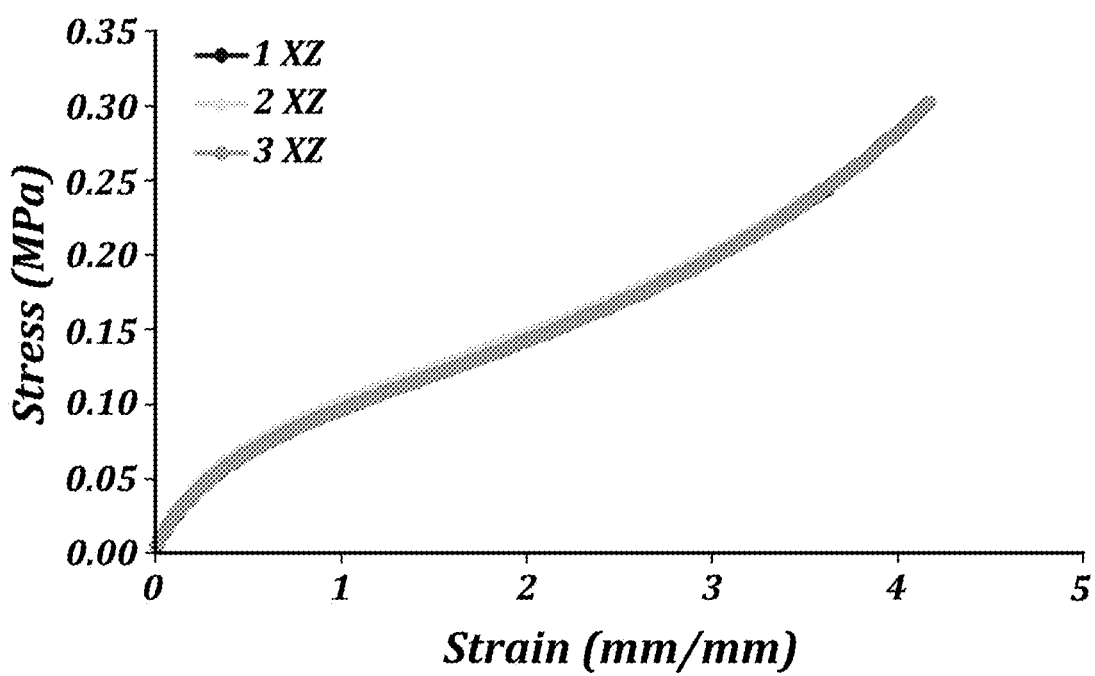
FIG. 6B is a graph of the tensile elongation of ThrashOH-flex (1%) XZ ASTM D638 Type V dogbone specimens.
Figure 6C:
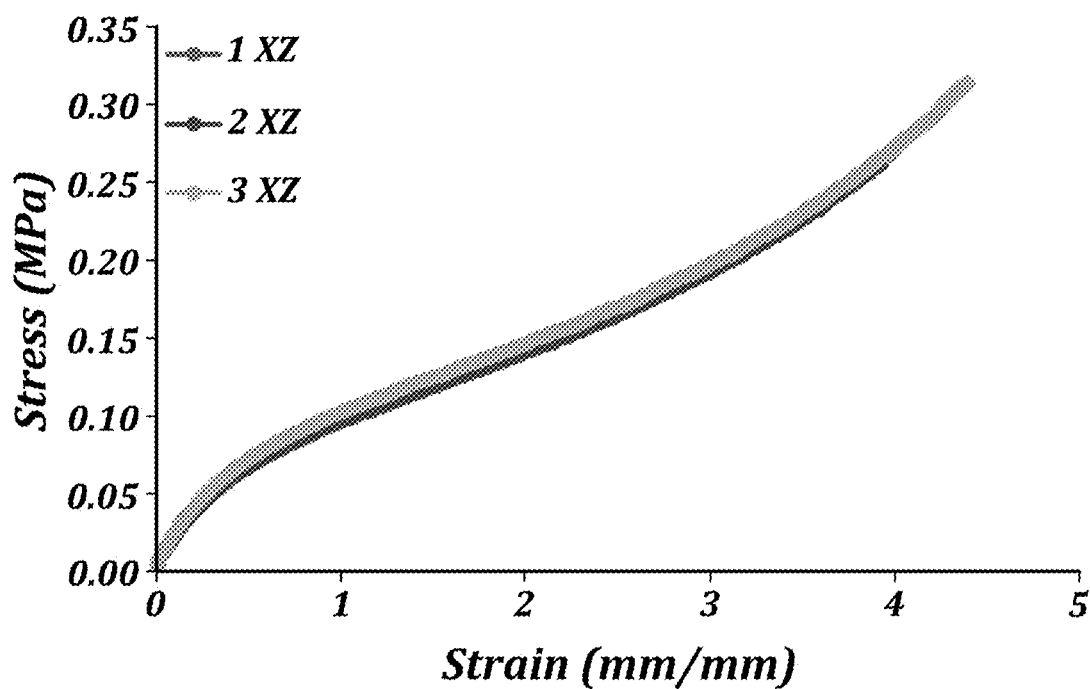
FIG. 6C is a graph of the tensile elongation of ThrashOH-flex (1%) ZX ASTM D638 Type V dogbone specimens.
Figure 6D:
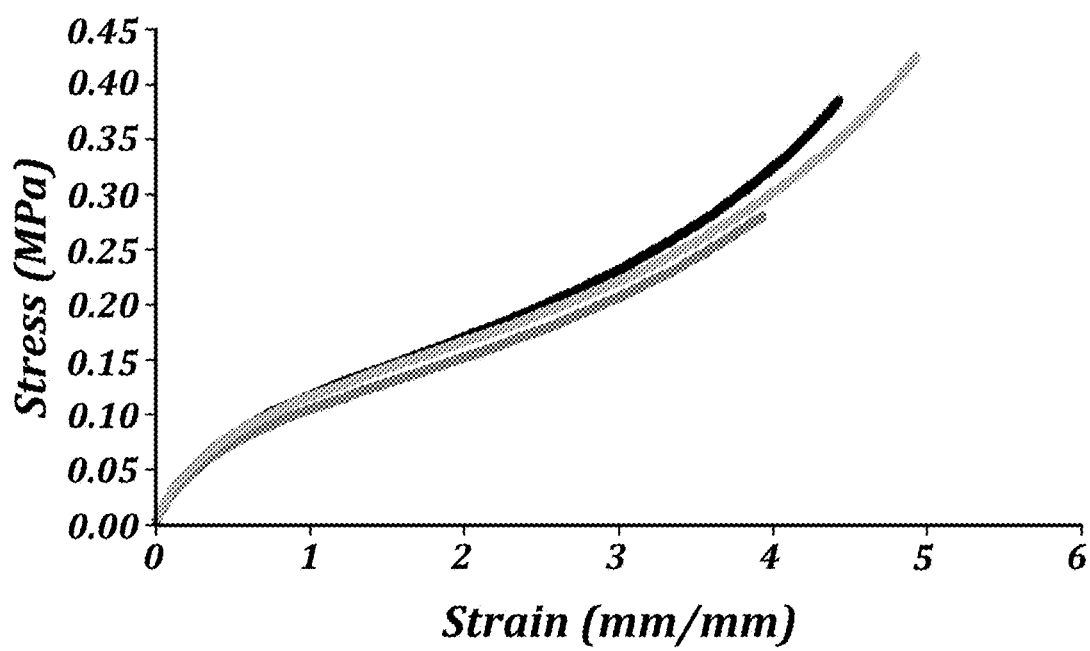
FIG. 6D is a graph of the tensile elongation of ThrashOH-flex (0.25%) ASTM D638 Type V dogbone specimens.
Figure 6E:
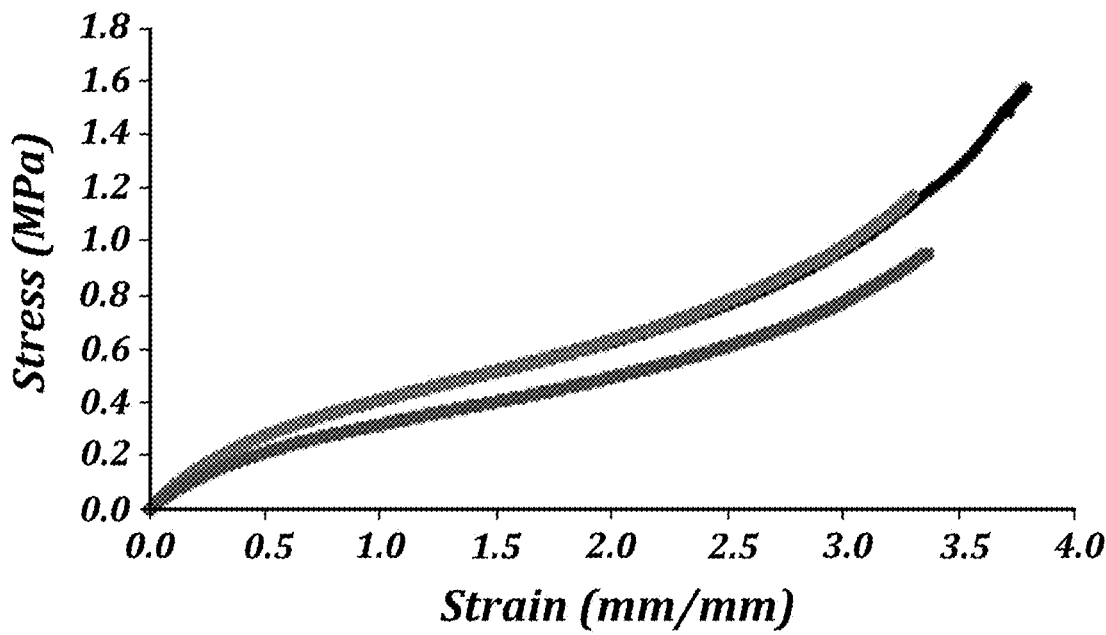
FIG. 6E is a graph of the tensile elongation of HEA (1%) ASTM D638 Type V dogbone specimens.
Figure 6F:
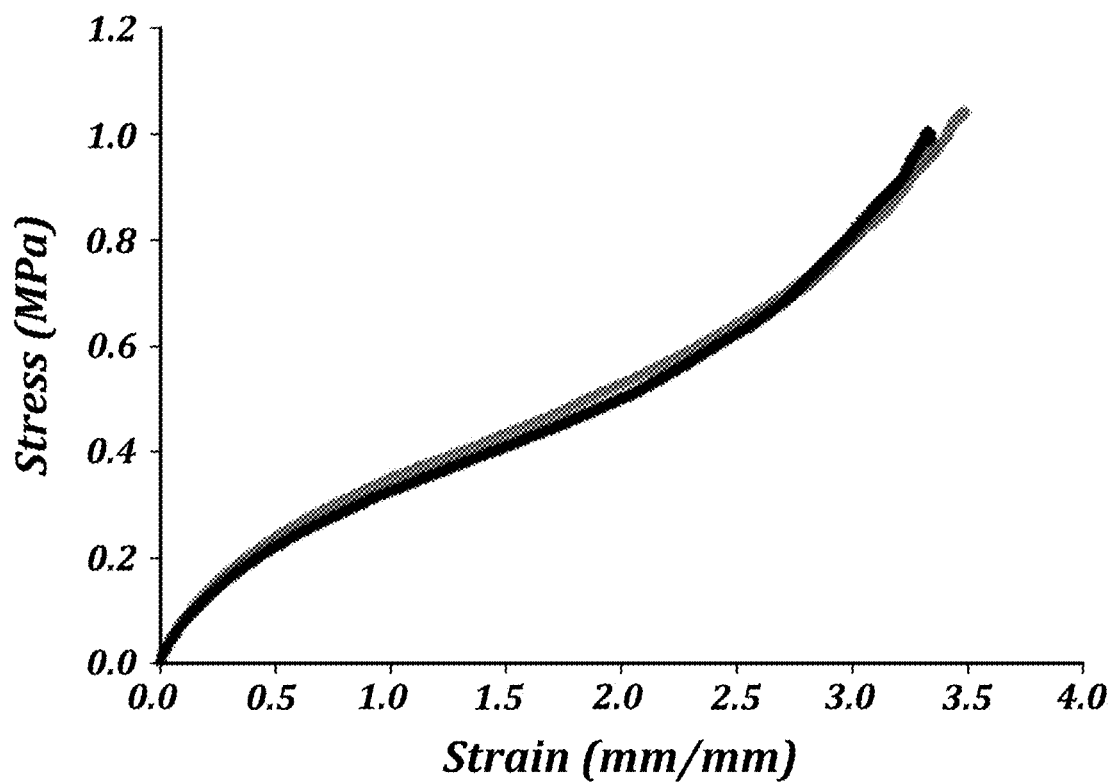
FIG. 6F is a graph of the tensile elongation of SilOHflex (0.25%) ASTM D638 Type V dogbone specimens.
Figure 6G:
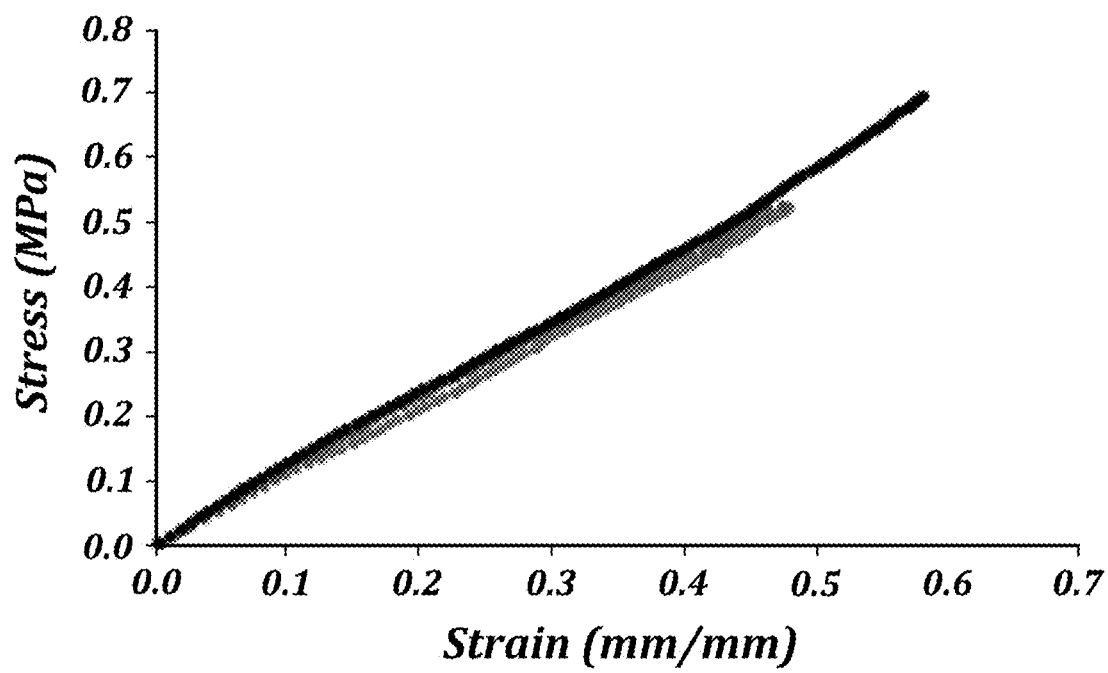
FIG. 6G is a graph of the tensile elongation of PDMSD-MAA (0.25%) ASTM D638 Type V dogbone specimens.
Figure 6H:
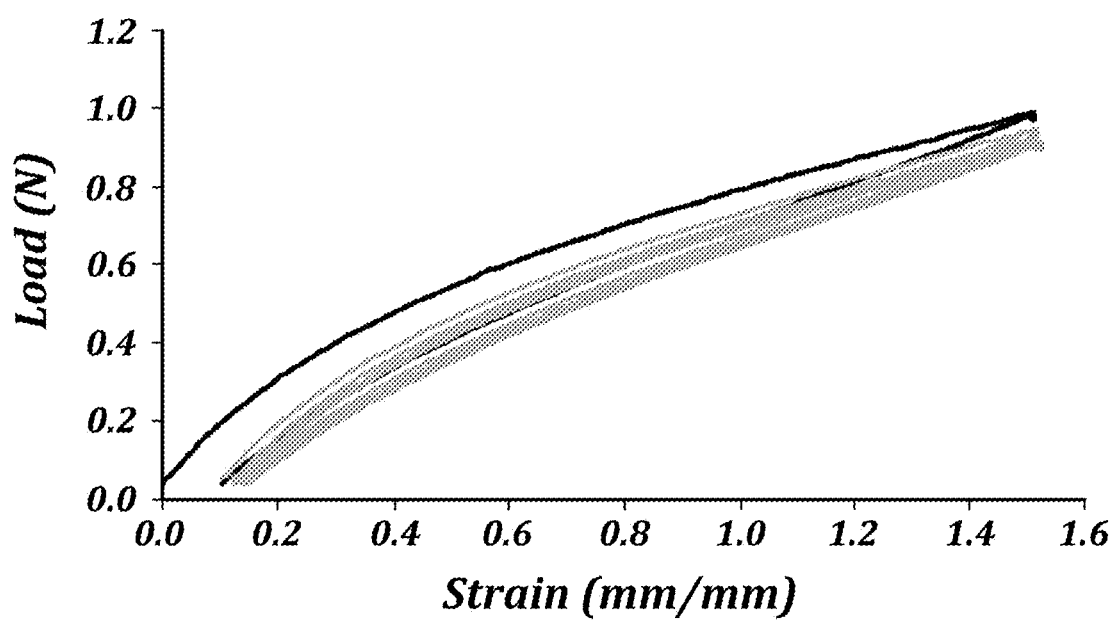
FIG. 6H is a graph of the cyclic tensile elongation (total cycles=5) of ThrashOHflex (1) ASTM D638 Type V dogbone specimens.
Figure 6I:
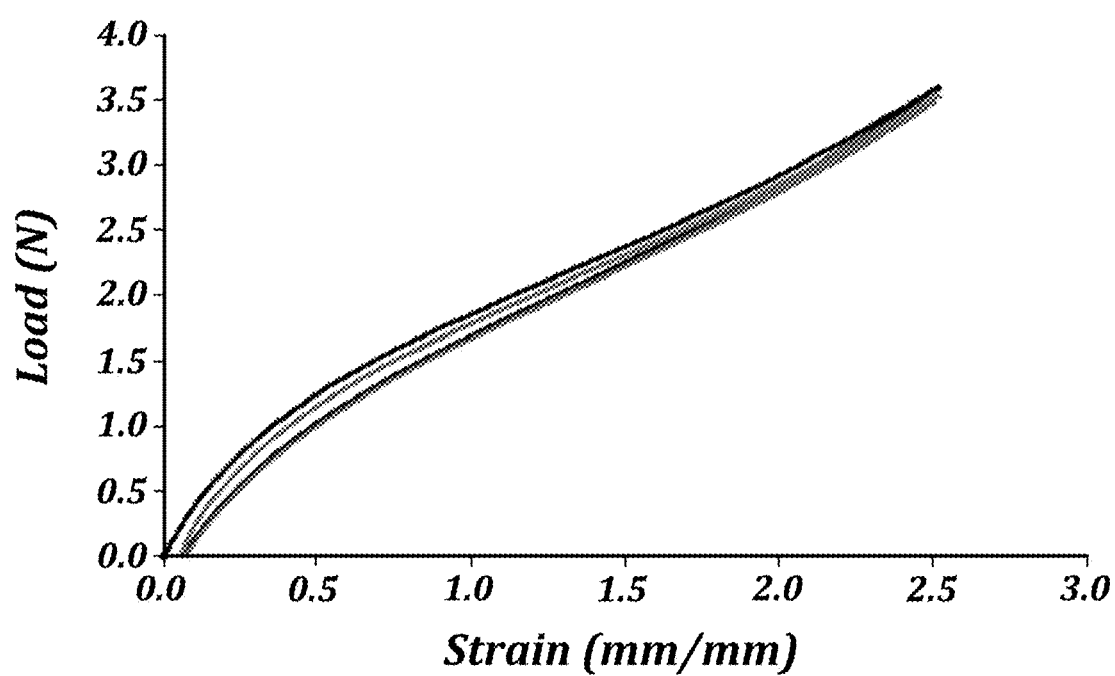
FIG. 6I is a graph of the cyclic tensile elongation (total cycles=5) of HydrOHflex (1) ASTM D638 Type V dogbone specimens.

Printing orientation in the ZX, XZ, and XY directions (FIG. 5) were studied.

Synthesis bis(propylacrylamide)poly(dimethylsiloxane) (PDMSD-MAA)

Methacryloyl chloride (22 mmol) was added dropwise to a solution of bis(propylamine)poly(dimethylsiloxane) (5 kDa, 10 mmol) and anhydrous tri ethyl amine (22 mmol) in methylene chloride (150 mL) at 0° C. The reaction was left for 24 hours and allowed to warm up to room temperature. Vacuum was used to evaporate off methylene chloride and 200 mL of hexane was added to the reaction mixture. The reaction mixture was filtered through a fitted glass frit and washed three times with an 80/20 mixture of brine and saturated aqueous sodium bicarbonate solution, during which a centrifuge was used to separate the emulsion mixture. The organic phase was subsequently dried with anhydrous calcium sulfate, filtered, and dried under vacuum to yield a viscous clear liquid (82.8% recovery). 1H NMR (500 MHz, CDCl3, 298 K, δ, ppm): 5.85 (s, 1H), 5.67 (s, 1H), 5.30 (s, 1H), 3.30 (q, J=6.5 Hz, 2H), 1.96 (s, 3H), 1.56 (m, J=8 Hz, 2H), 0.55 (m, J=4.5 Hz, 2H), 0.07 (s, 198H).

Scheme 1. Synthesis of PMSDMAA (average n = 66).

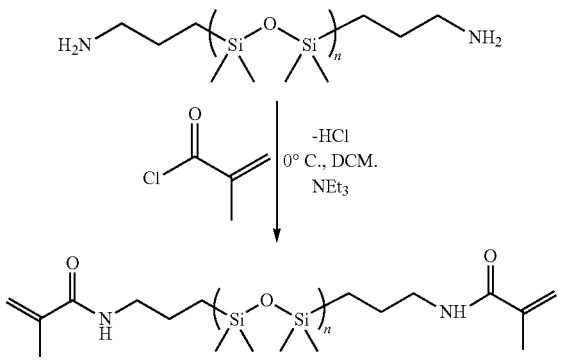

Resin Compositions and Printer Settings
General Printing Parameters
Light intensity: 80 klx
Layer height: 0.1 mm
Z-lift speed: 100 mm/min
Z-lift distance: 3 mm
Post-cure procedure: Bathe in excess white light at 80 klx intensity for 30 seconds per side.
Article Compositions
ThrashOHflex (1%) XY
60 wt % 2-(2-ethoxyethoxy)ethyl acrylate
40 wt % hydroxyethyl acrylate
1 wt % of monomer bis(2,4,6-trimethylbenzoyl)-phenylphosphineoxide (Irgacure 819)
Exposure time: 10 s
ThrashOHflex (1%) XZ
60 wt % 2-(2-ethoxyethoxy)ethyl acrylate
40 wt % hydroxyethyl acrylate (stock solution containing 3.7 mol % diacrylate)
1 wt % of monomer bis(2,4,6-trimethylbenzoyl)-phenylphosphineoxide (Irgacure 819)
Exposure time: 10 s
ThrashOHflex (1%) ZX
60 wt % 2-(2-ethoxyethoxy)ethyl acrylate
40 wt % hydroxyethyl acrylate (stock solution containing 3.7 mol % diacrylate)
1 wt % of monomer bis(2,4,6-trimethylbenzoyl)-phenylphosphineoxide (Irgacure 819)
Exposure time: 10 s
ThrashOHflex (0.25%)
60 wt % 2-(2-ethoxyethoxy)ethyl acrylate
40 wt % hydroxyethyl acrylate (stock solution containing 3.7 mol % diacrylate)
0.25 wt % of monomer bis(2,4,6-trimethylbenzoyl)-phenylphosphineoxide (Irgacure 819)
Exposure time: 18 s
SilOHflex (0.25%)
62.3 wt % hydroxyethyl acrylate (stock solution containing 3.7 mol % diacrylate)
26.7 wt % butyl acrylate
8.8 wt % PDMSDMAA
2.2 wt % cetyltrimethylammonium bromide
0.25 wt % of monomer bis(2,4,6-trimethylbenzoyl)-phenylphosphineoxide (Irgacure 819)
Exposure time: 15 s
HEA (1%)
100 wt % hydroxyethyl acrylate (stock solution containing 3.7 mol % diacrylate)
1 wt % of monomer bis(2,4,6-trimethylbenzoyl)-phenylphosphineoxide (Irgacure 819)
Exposure time: 6 s
PDMSDMAA (0.25%)
Printed on top of 30 mL of brine according to the procedure described in the Biphasic Vat Photopolymerization section above.
95 wt % PDMSDMAA
5 wt % toluene
0.25 wt % of monomer bis(2,4,6-trimethylbenzoyl)-phenylphosphineoxide (Irgacure 819)
Exposure time: 24s
Visual Appearance
Printed resins were found to be transparent for ThrashOHflex, HEA, and PDMSDMAA resin compositions. SilOHflex objects appeared cloudy white and were opaque in thicknesses greater than 1 mm. Persistent yellowing was observed for ThrashOHflex samples, an effect which appeared somewhat diminished in 0.25 wt % initiator samples as opposed to both 1 wt % and 2 wt % samples. This yellowing was apparent in SilOHflex and HEA samples, but did not appear to persist after multiple days in ambient light. No yellowing was observed in PDMSDMAA samples.
Shore A Hardness Tests
Printed objects were tested with a PCE-DD-A durometer for Shore A hardness values over three trials (Table 2). Objects were placed on a hard surface and the durometer indenter was gently placed so as to bring the object and durometer surface in level contact.

TABLE 2

Shore A hardness of printed objects

| Material | Shore A hardness |
| --- | --- |
| ThrashOHflex 1% | 15.0 ± 2.4 |
| ThrashOHflex 0.25% | 13.7 ± 0.6 |
| HEA 1% | 33.3 ± 0.6 |
| SilOHflex 0.25% | 22.0 ± 1.0 |
| PDMSDMAA 0.25% | 23 ± 2.0 |

Monomer Leaching Tests
Printed disks (r=10 mm, h=1 mm) of each material were weighed and then soaked in 3.0 mL of dichloromethane (DCM) for 2 hours. A separate vial was then filled with 1.0 mL of the 3.0 mL of soaking solution. These solutions were analyzed by GC/MS and the abundance of peaks corresponding to HEA and 2-(2-ethoxyethoxy) ethyl acrylate (EEEA) were recorded. GC/MS was accomplished with injection volumes of 1 μL, an initial oven temp of 60° C. held for 1 min, ramped 15° C./min to 320° C. and held for 3 min. HEA monomer was found at time 4.143 min and EEEA monomer was found at 7.434 min. A stock solution of 0.1 mg/mL HEA and EEEA was prepared and the abundance of peaks corresponding to HEA and EEEA were recorded and used to correlate abundance and concentration. Mass of monomer leached was determined using the converted concentration and 3.0 mL of total starting solution and subsequently compared to the mass of the respective printed disk.

TABLE 3

HEA and EEEA leaching.

| Material | HEA (mg/g) | EEEA (mg/g) |
| --- | --- | --- |
| ThrashOHflex (1%) | 0.003 ± 0.0001 | 0.288 ± 0.010 |
| ThrashOHflex (0.25%) | 0.387 ± 0.018 | 7.709 ± 0.238 |

TABLE 3-continued

HEA and EEEA leaching.

| Material | HEA (mg/g) | EEEA (mg/g) |
|---|---|---|
| ThrashOHflex (0.25%) no post-cure | 2.145 ± 0.041 | 24.244 ± 1.050 |
| HEA (1%) | 0.020 ± 0.002 | 0 |
| SilOHflex (0.25%) | 1.136 ± 0.034 | 0 |

Swelling Tests

Printed disks (r=10 mm, h=1 mm) of each material were weighed and volume measured using calipers. Samples were swelled in an excess of deionized water for 24 hours. Excess water was dabbed off and samples were then weighed and measured using calipers to determine volume. Average increases in mass and volume are reported.

TABLE 4

Swelling test results.

| material | mass increase | volume increase |
|---|---|---|
| ThrashOHflex 1% | 2.85 ± 0.01 | 2.93 ± 0.23 |
| ThrashOHflex 0.25% | 2.98 ± 0.03 | 3.23 ± 0.07 |
| HEA 1% | 3.35 ± 0.07 | 2.84 ± 0.73 |
| SilOHflex 0.25% | 1.55 ± 0.06 | 1.64 ± 0.20 |
| PDMSDMAA 0.25% | 1.01 ± 0.01 | 1.01 ± 0.01 |

Instron Plots

Tensile elongation of ThrashOHflex (1%) XY ASTM D638 Type V dogbone specimens, tensile elongation of ThrashOHflex (1%) XZ ASTM D638 Type V dogbone specimens, tensile elongation of ThrashOHflex (1%) ZX ASTM D638 Type V dogbone specimens, tensile elongation of ThrashOHflex (0.25%) ASTM D638 Type V dogbone specimens, tensile elongation of HEA (1%) ASTM D638 Type V dogbone specimens, tensile elongation of SilOHflex (0.25%) ASTM D638 Type V dogbone specimens, tensile elongation of PDMSDMAA (0.25%) ASTM D638 Type V dogbone specimens, Cyclic tensile elongation (total cycles=5) of ThrashOHflex (1) ASTM D638 Type V dogbone specimens, and cyclic tensile elongation (total cycles=5) of HydrOHflex (1) ASTM D638 Type V dogbone specimens are shown in FIGS. 6A-6I. For the tensile elongation tests, specimens were elongated at 100 mm/min until failure. Testing was conducted according to ASTM D638 standard methods. For the cyclic tensile elongation tests, specimens were elongated at 100 mm/min to 250% strain.

Rheology Data and Plots

Figure 7:
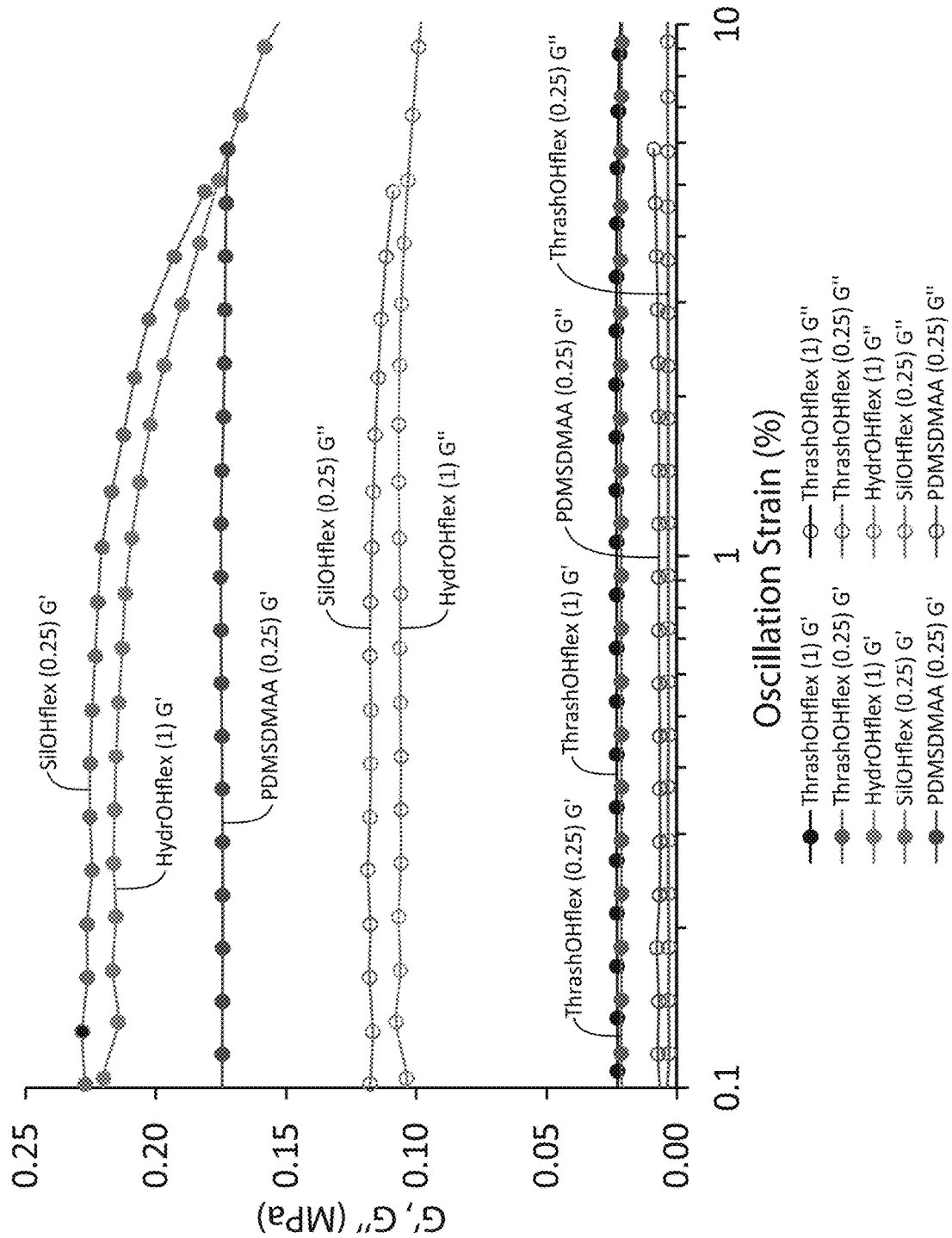
FIG. 7 is a graph of representative rheological G' and G" values of printed disks of various resin compositions (from 0.1-5% oscillation strain).

G' and G" values were evaluated as printed disks (r=10 mm, h=1 mm) underwent a strain sweep test from 10-50,000 Pa at 25° C. and an angular frequency of 6.28 rad/s using a 20 mm parallel Peltier plate of stainless steel. Storage and loss modulus data were compared near 0.1% oscillation strain. FIG. 7 shows G' and G" values of printed disks of various resin compositions (from 0.1-5% oscillation strain), where values shown are averages of three trials.

TABLE 5

Rheology test results

| material | G' (MPa) | G" (MPa) | tan delta |
|---|---|---|---|
| ThrashOHflex (1%) | 0.023 ± 0.001 | 0.004 ± 0.0004 | 0.19 ± 0.02 |
| ThrashOHflex (0.25%) | 0.025 ± 0.004 | 0.003 ± 0.0006 | 0.13 ± 0.01 |
| HEA (1%) | 0.218 ± 0.021 | 0.106 ± 0.014 | 0.49 ± 0.03 |
| SilOHflex (0.25%) | 0.228 ± 0.047 | 0.117 ± 0.029 | 0.51 ± 0.002 |
| PDMSDMAA (0.25%) | 0.174 ± 0.022 | 0.007 ± 0.001 | 0.04 ± 0.02 |

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize. Embodiments of the invention may include relative dimensions, ranges, and ratios (greater than, less than, etc.) as shown in the examples above, while not being strictly limited to the underlying precise values shown or illustrated herein.

While illustrative embodiments have been illustrated and described, it will be appreciated that various changes can be made therein without departing from the spirit and scope of the invention.

The invention claimed is:

1. A method of making an article, comprising:
    (a) providing a composition comprising two or more types of polymerizable monomers and two or more types of polymerization initiators, wherein the composition comprises a build region, wherein each type of polymerizable monomer is configured to be polymerizable using a respective type of polymerization initiator of the two or more types, and each respective type of polymerization initiator cannot polymerize a different type of polymerizable monomer of the two or more types;
    (b) exposing the build region to two or more polymerization stimuli;
    (c) polymerizing the two or more types of polymerizable monomers at the build region to provide a polymer layer; and
    (d) advancing the polymer layer away from the build region to provide a patterned three-dimensional article containing two or more heterogeneous integrally mixed polymers;
    wherein the polymerization stimuli comprise light having at least two predetermined wavelengths, each predetermined wavelength having a predetermined irradiation pattern, and the build region is exposed to the polymerization stimuli concurrently for a predetermined duration.

2. The method of claim 1, wherein the composition is in the form of a first liquid layer and a second liquid layer, and the build region is at a liquid-liquid interface between the first and second liquid layers;
    wherein
    at least one of the first liquid layer and the second liquid layer comprises at least one polymerization initiator of the two or more types of polymerization initiators;
    at least one of the first liquid layer and the second liquid layer comprises at least one type of polymerizable monomers of the two or more types of polymerizable monomers; and
    the second liquid layer has a lower density than the first liquid layer.

3. The method claim 1, wherein the two or more types of polymerizable monomers are independently selected from acrylate monomers, acrylic acid monomers, epoxy monomers, thiol monomers, vinyl monomers, vinyl amide monomers, vinyl ester monomers, silyl hydride monomers, and vinyl ether monomers.

4. The method of claim 1, wherein the composition further comprises a monomer of Formula (I)

$$CH2=CR1—COR2(CH2)_n—OH \quad (I)$$

wherein:
R1 is H or methyl,
R2 is O or NR3, wherein R3 is H, alkyl, or aryl, and
n is an integer selected from 1 to 10.

5. The method of claim 1, wherein the composition further comprises one or more types of crosslinking agents.

6. The method of claim 5, wherein the one or more types of crosslinking agents are selected from trimethylolpropane triacrylate (TMPTA), ethylene glycol diacrylate, 1,6-hexanediol dimethacrylate (HDDA), epoxycyclohexylmethyl-3,4-epoxycyclohexanecarboxylate (EPOX), poly (dimethyl siloxane) dimethacrylamide, poly (dimethyl siloxane) acrylamide, poly (ethylene glycol) diacrylate, bisphenol A glycerolate (1-glycerol/phenol) diacrylate, di(ethyleneglycol) diacrylate, pentaerythritol tetraacrylate, 1,1,3,3-tetramethyl-1,3-bis[2-(7-oxabicyclo[4.1.0]hept-3-yl)ethyl]-disiloxane, and diethyleneglycol diacrylate.

7. The method of claim 1, wherein the two or more types of polymerization initiators are photoinitiators.

8. The method of claim 7, wherein the photoinitiators are each independently selected from phenyl bis (2,4,6-trimethyl benzoy) phosphine oxide, a triarylsulfonium hexafluoroantimonate salt, 4-isopropyl-4'-methyldiphenyliodonium tetrakis (pentafluorophenyl) borate, H-Nu 660, H-Nu 640, a carbocyanine alkyltriphenyl borate salt, (η6-carbazole)(η5-cyclopentadienyl) iron hexafluorophosphate, (η6-chlorobenzene) (η5-cyclopentadienyl) iron hexafluorophosphate, (η6-alkylcarbazole) (η5-cyclopentadienyl) iron hexafluorophosphate, H-Nu 254, a diphenyl iodonium salt, and a alkyltriphenyl borate salt.

9. The method of claim 1, wherein the composition further comprises one or more photosensitizers.

10. The method of claim 9, wherein the one or more photosensitizers are independently selected from 2-ethyl-9,10-dimethoxyanthracene, anthracene, chlorophyll, and camphorquinone.

11. The method of claim 1, wherein the composition further comprises a pigment selected from titanium dioxide, carbon black, an organic ultraviolet light absorber, an organic visible light absorber, graphene, carbon nanotubes, and any combination thereof.

12. The method of claim 11, wherein the pigment is present in an amount of 0.001 to 10 percent by weight relative to the composition.

13. The method of claim 1, wherein the composition further comprises one or more components selected from the group consisting of: ionic liquids, organic solvents, aqueous liquids, salts, miscible high-viscosity liquids, miscible high-density liquids, particles, dyes, polymers, surfactants, and biological agents.

14. The method of claim 1, wherein the two or more types of monomers form a microphase separation at the build region.

15. The method of claim 1, further comprising repeating steps (b)-(d) to provide the three-dimensional article.

16. The method of claim 1, wherein the three-dimensional article comprises a heterogeneous distribution of the two or more integrally mixed polymers.

17. The method of claim 1, wherein the three-dimensional article has a heterogeneous distribution of mechanical and chemical properties.

* * * * *